United States Patent
Biham et al.

(10) Patent No.: US 12,047,494 B2
(45) Date of Patent: Jul. 23, 2024

(54) PROTECTED PROTOCOL FOR INDUSTRIAL CONTROL SYSTEMS THAT FITS LARGE ORGANIZATIONS

(71) Applicant: Technion Research & Development Foundation Limited, Haifa (IL)

(72) Inventors: Eli Biham, Haifa (IL); Sara Bitan-Erlich, Haifa (IL); Alon Dankner, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 240 days.

(21) Appl. No.: 17/543,979

(22) Filed: Dec. 7, 2021

(65) Prior Publication Data

US 2022/0182229 A1    Jun. 9, 2022

Related U.S. Application Data

(60) Provisional application No. 63/122,047, filed on Dec. 7, 2020.

(51) Int. Cl.
*H04L 9/08* (2006.01)
*H04L 9/32* (2006.01)

(52) U.S. Cl.
CPC .......... *H04L 9/0825* (2013.01); *H04L 9/3213* (2013.01); *H04L 9/3228* (2013.01); *H04L 9/3242* (2013.01)

(58) Field of Classification Search
CPC ... H04L 9/0825; H04L 9/3213; H04L 9/3228; H04L 9/3242
See application file for complete search history.

(56) References Cited

U.S. PATENT DOCUMENTS 7,123,974 B1 * 10/2006 Hamilton ........... G05B 19/4063
                                                    700/86
7,260,716 B1 * 8/2007 Srivastava ............ H04L 9/0827
                                                    713/168

(Continued)

OTHER PUBLICATIONS

Beresford "Exploiting Siemens Simatic S7 PLCs", Black Hat USA+211, p. 1-26, Jul. 8, 2011.

(Continued)

*Primary Examiner* — J. Brant Murphy

(57) ABSTRACT

One of the main obstacles of securing industrial control systems is the lack of an appropriate security model that is both implementable by vendors and addresses the inherent security and usability issues needed by organizations. Current solutions such as device passwords and IPSec lack scalable key management infrastructure and fine granularity access control mechanisms. A security model for industrial control systems that supports organizational level authorizations and authentication requirements, while hiding the low-level details (e.g., keys and passwords) from the users is disclosed. It also enables easy addition and removal of PLCs, engineering station, HMI devices and users, and assigning permission to them. A major advantage is its support for hybrid ICS systems, characterized by co-existence of legacy devices and new devices, while using the same protocol. Devices may communicate therein either natively, or by a connected converter. This co-existence allows organizations to gradually switch from a fully-legacy ICS to ICS natively supporting the disclosed security model, by replacing a single (or a few) devices at a time, incurring little or no system downtime. An exemplary protocol supporting the disclosed security model, namely K7, is based on the Siemens S7 protocol, and enhances it with new cryptographic features to support the extra functionality. Similar enhancements may be applied to other protocols. A ticket- (Continued)

The Structure of T7's Tickets.

based system, (e.g., Kerberos with LDAP server) used to support the exchange of permissions and keys, is incorporated into the disclosed protocol. K7 may be implemented as a protocol converter add-on to standard Siemens clients and PLCs that transform them into augmented devices that use K7. Siemens and other vendors may add direct support for K7 on their ICS systems, devices, and the like in the future.

22 Claims, 19 Drawing Sheets

(56) References Cited

U.S. PATENT DOCUMENTS

| | | | | |
|---|---|---|---|---|
| 7,434,046 | B1* | 10/2008 | Srivastava | H04L 9/0891 |
| | | | | 713/168 |
| 9,866,568 | B2* | 1/2018 | Hart | H04L 63/102 |
| 10,673,617 | B1* | 6/2020 | Antoniou | G06F 13/4282 |
| 2011/0010770 | A1* | 1/2011 | Smith | H04L 9/083 |
| | | | | 726/18 |
| 2017/0264617 | A1* | 9/2017 | Hart | H04L 63/1416 |
| 2017/0324758 | A1* | 11/2017 | Hart | H04L 63/0428 |

OTHER PUBLICATIONS

Biham et al. "Rogue7: Rogue Engineering-Station Attacks on S7 Simatic PLCs", Black Hat USA, p. 1-21, 2019.

Falliere et al. "W32.Stuxnet Dossier. Version 1.4", Symantec Corporation, Secuity Response, White Paper, p. 1-69, Feb. 11, 2011.

Kent et al. "Security Architecture for the Internet Protocol", Network Working Group, Request for Comments: RFC 4301, p. 1-102, Dec. 2005.

Kohl et al. "The Kerberos Network Authentication Service (V5)", Network Working Group, Request for Comments, RFC: 1510, p. 1-113, Sep. 1993.

Langner "Stuxnet: Dissecting a Cyberwarfare Weapon", IEEE Security & Privacy, 9(3): 49-51, May/Jun. 2011.

Manz et al. "A Hybrid Authentication and Authorization Process for Control System Networks", 2010 Sixth International Conference on Information Assurance and Security, Atlanta, GA, USA, Aug. 23-25, 2010, p. 36-39, Aug. 23, 2010.

McKenzie "ISO Transport Protocol Specification ISO DP 8073", Network Working Group, Request for Comments, RFC: 905, ISO Technical Report, p. 1-156, Apr. 1984.

Microsoft "Active Directory Domain Services—Win32 Apps", Microsoft Docs, p. 1-3, May 31, 2018.

Microsoft "Microsoft Kerberos—Win32 Apps", Microsoft Docs, p. 1-2, May 31, 2018.

Naedele "An Access Control Protocol for Embedded Devices", 2006 IEEE International Conference on Industrial Informatics, Songaporc, Singapore, Aug. 16-18, 2006, p. 565-569, Aug. 18, 2006.

Rose et al. "ISO Transport Service on Top of the TCP, Version: 3", Network Working Group, Request for Comments, RFC: 1006, p. 1-18, May 1987.

Schneider Electric "Modicom Controllers Platform: Cyber Security Reference Manual: Original Instructions", Schneider Electric, EIO0000001999, p. 1-90, Oct. 2019.

Sermersheim "Lightweight Directory Access Protocol (LDAP): The Protocol", Network Working Group, Request for Comments: RFC 4511, p. 1-69, Jun. 2006.

Siemens "Simatic S7-1500 Security: Getting Started", Siemens AG, User Manual, A5E03982396-01, p. 1-22, Mar. 2013.

Steiner et al. "Kerberos: An Authentication Service for Open Network Systems", Proceedings of the Winter 1988 USENIX Conference, Dallas, TX, USA, Feb. 9-12, 1988, p. 191-202, Feb. 9, 1988.

Vollbrecht et al. "AAA Authorization Framework", The Internet Society Network Working Group, Request for Comments: RFC 2904, p. 1-35, Aug. 2000.

* cited by examiner

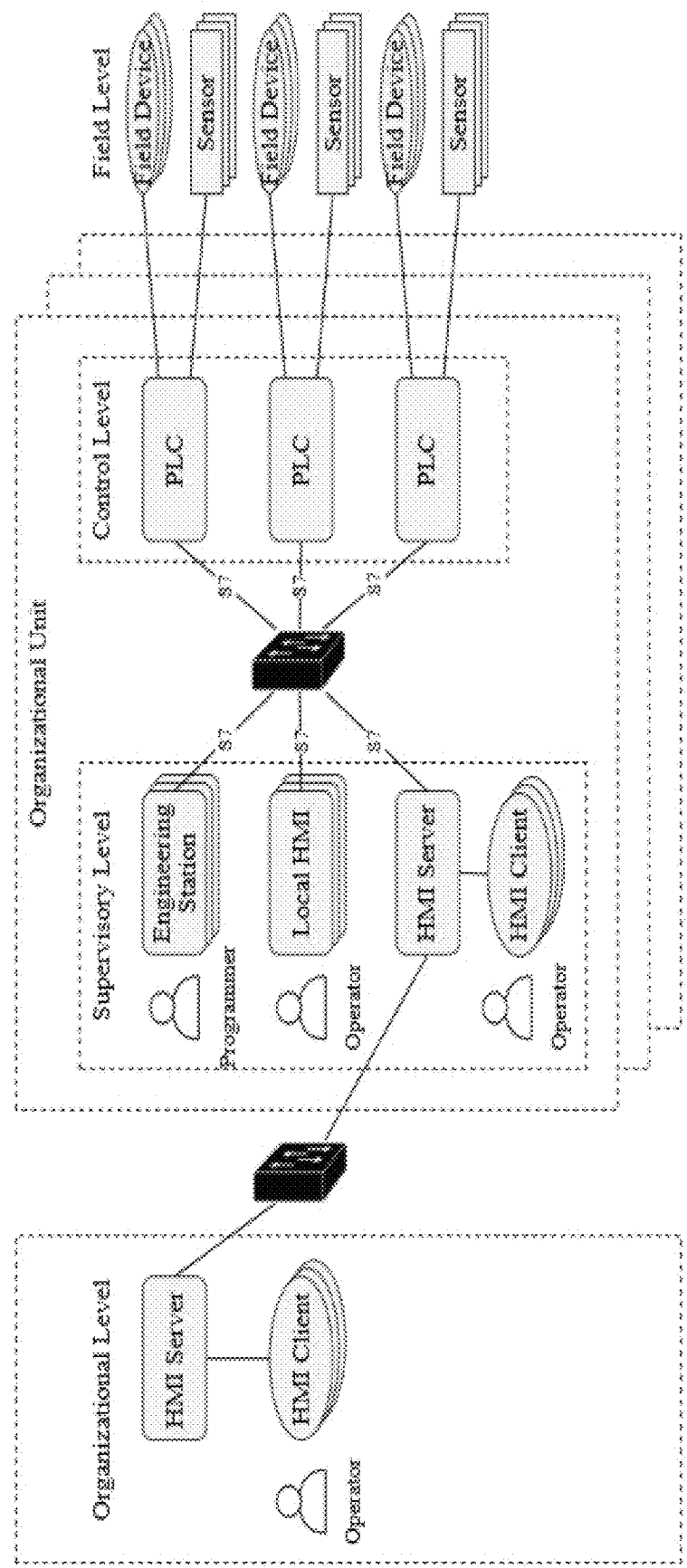
Figure 1: Typical Leveled ICS Topology

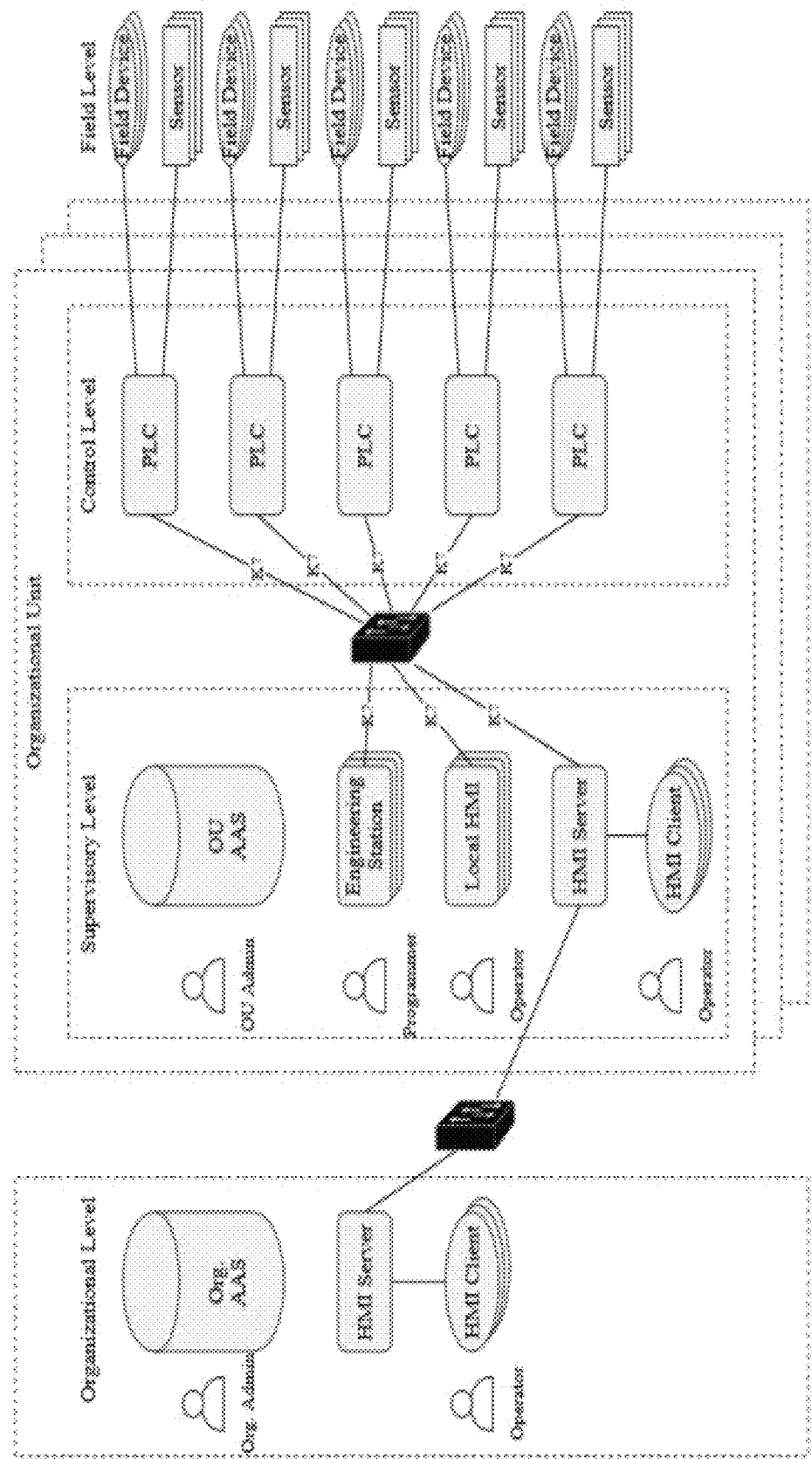
Figure 2: Typical K7-based ICS Topology

Figure 3: The Structure of S7 Protocol Payload Packets

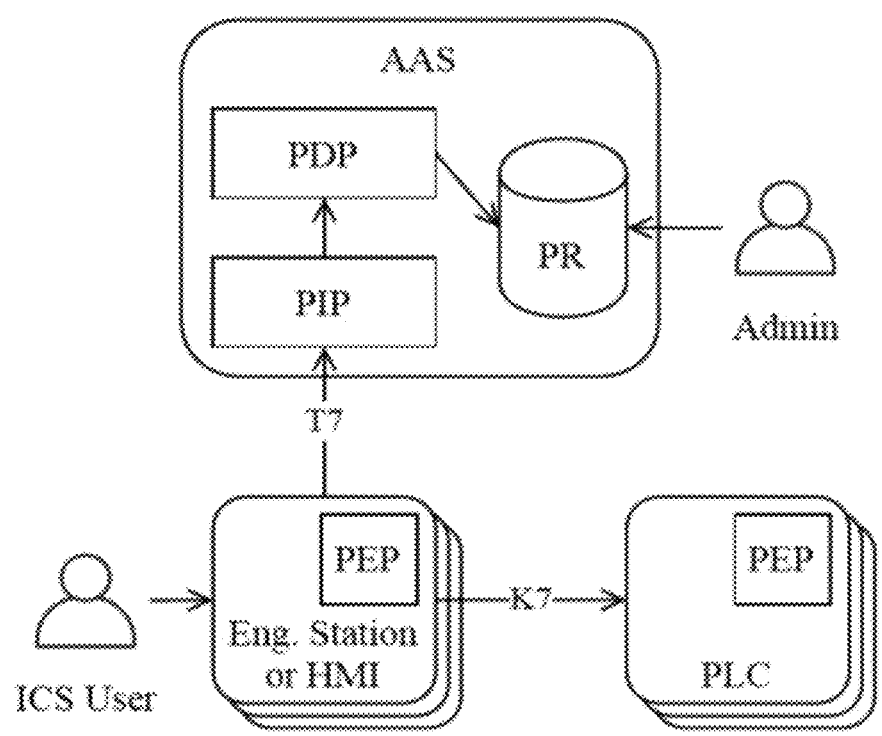
Figure 4: Architecture

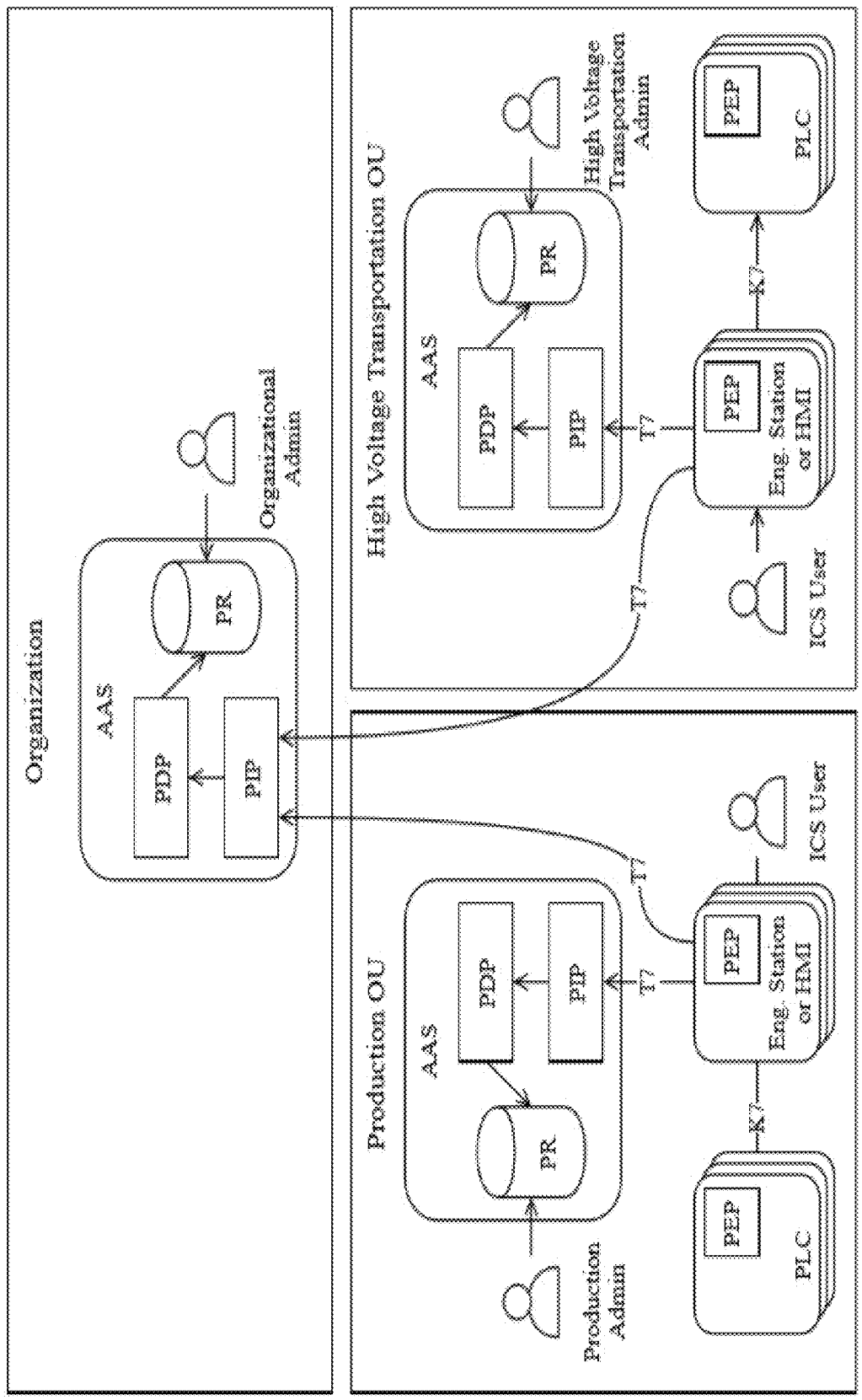
Figure 5: Hierarchical deployment

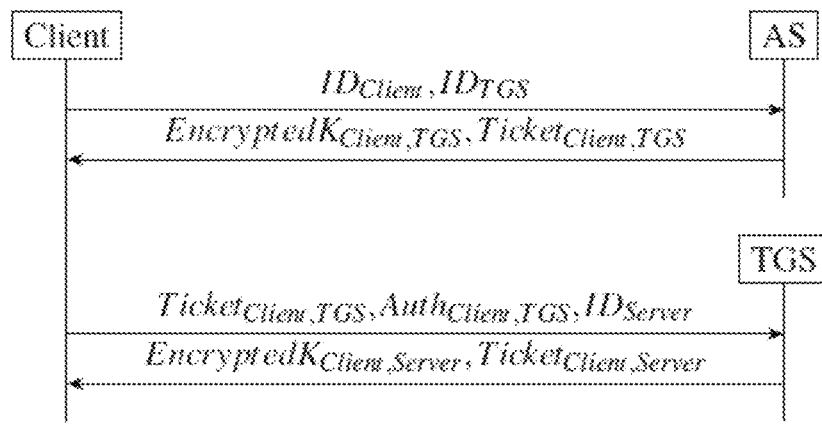
Figure 6: Outline of the Kerberos Key Exchange

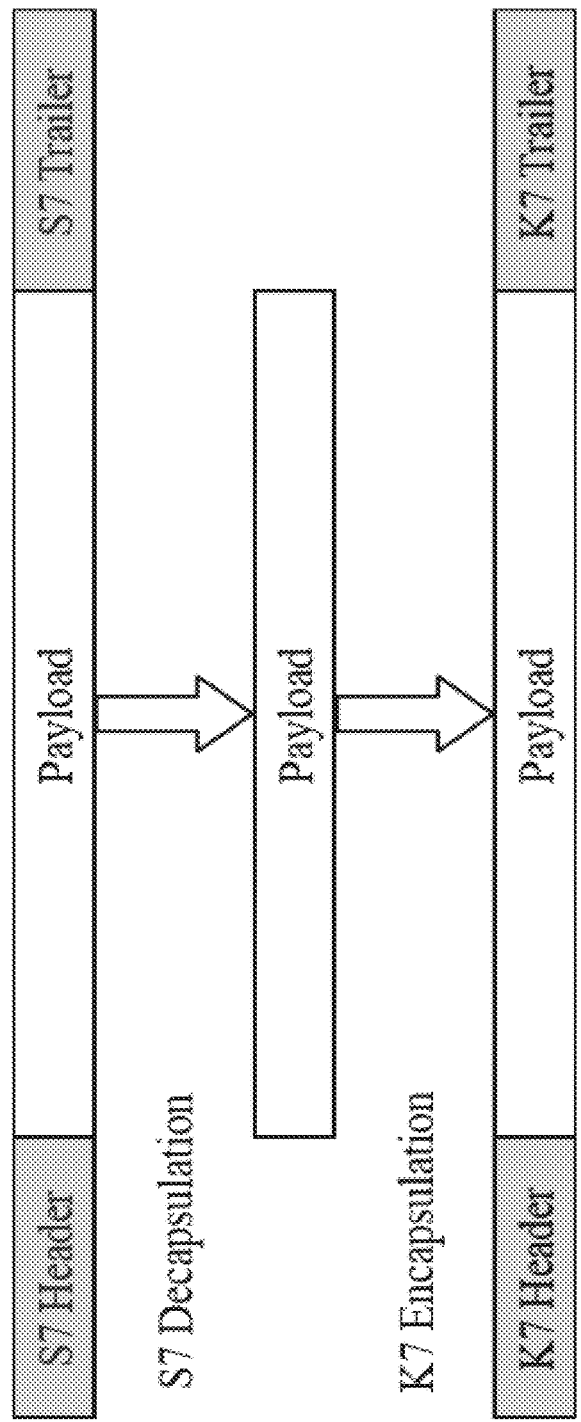
Figure 7: K7 encapsulation of original vendor's payloads

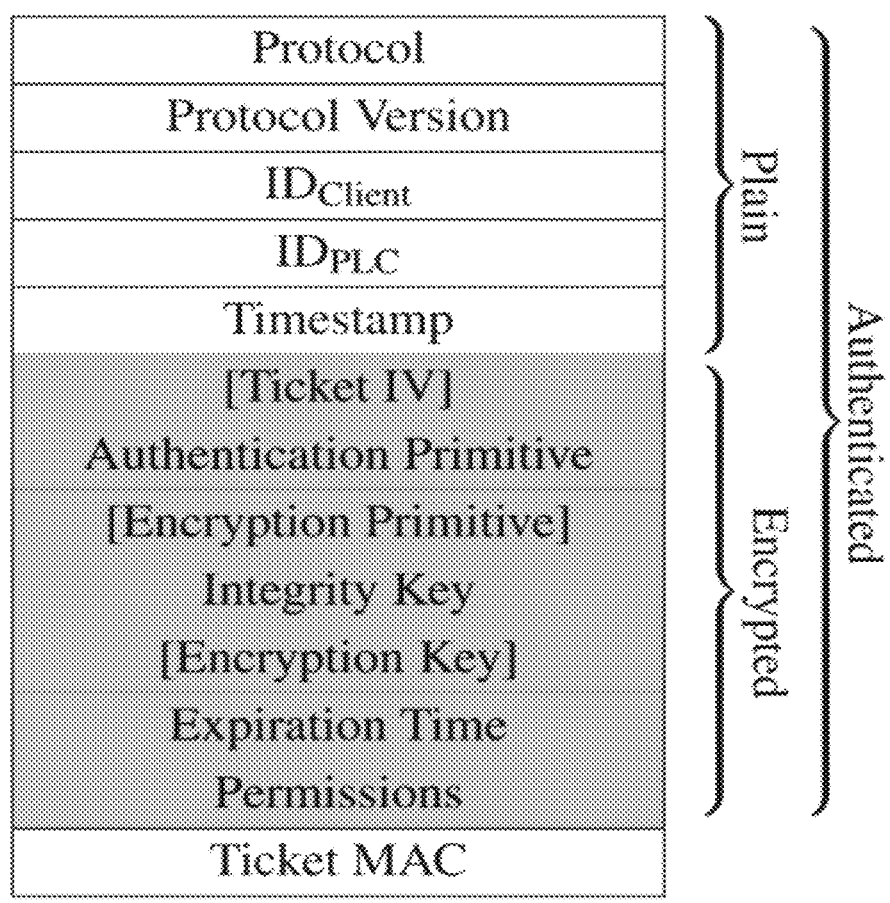
Figure 8: The Structure of T7's Tickets.

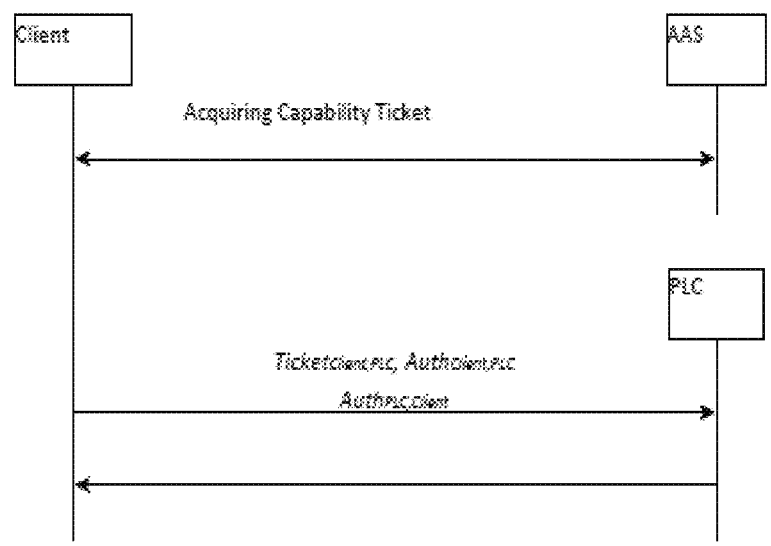
Figure 9: Outline of the K7 Handshake Protocol

| Protocol |
| Protocol Version |
| $ID_{Client}$ |
| $ID_{PLC}$ |
| Timestamp |
| Auth. MAC |

Figure 10: The Structure of the Authenticator

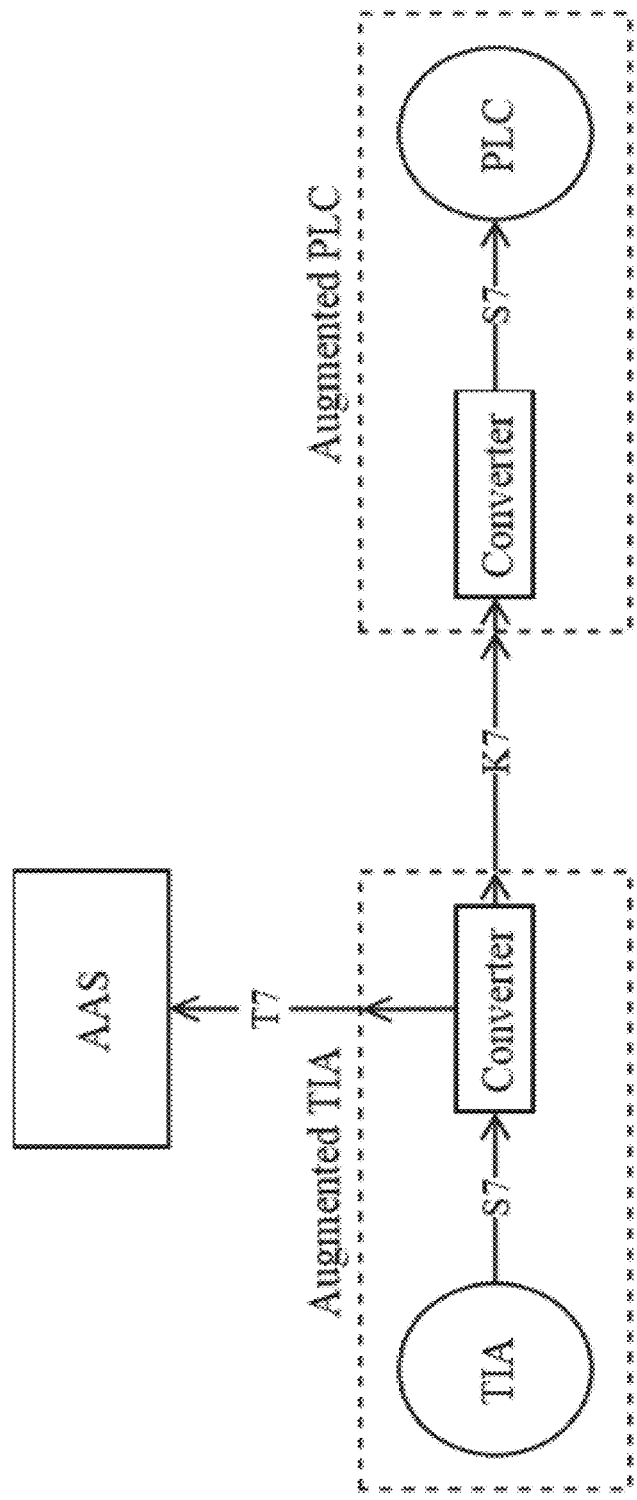
Figure 11: The Structure of Augmented TIA and PLC with AAS.

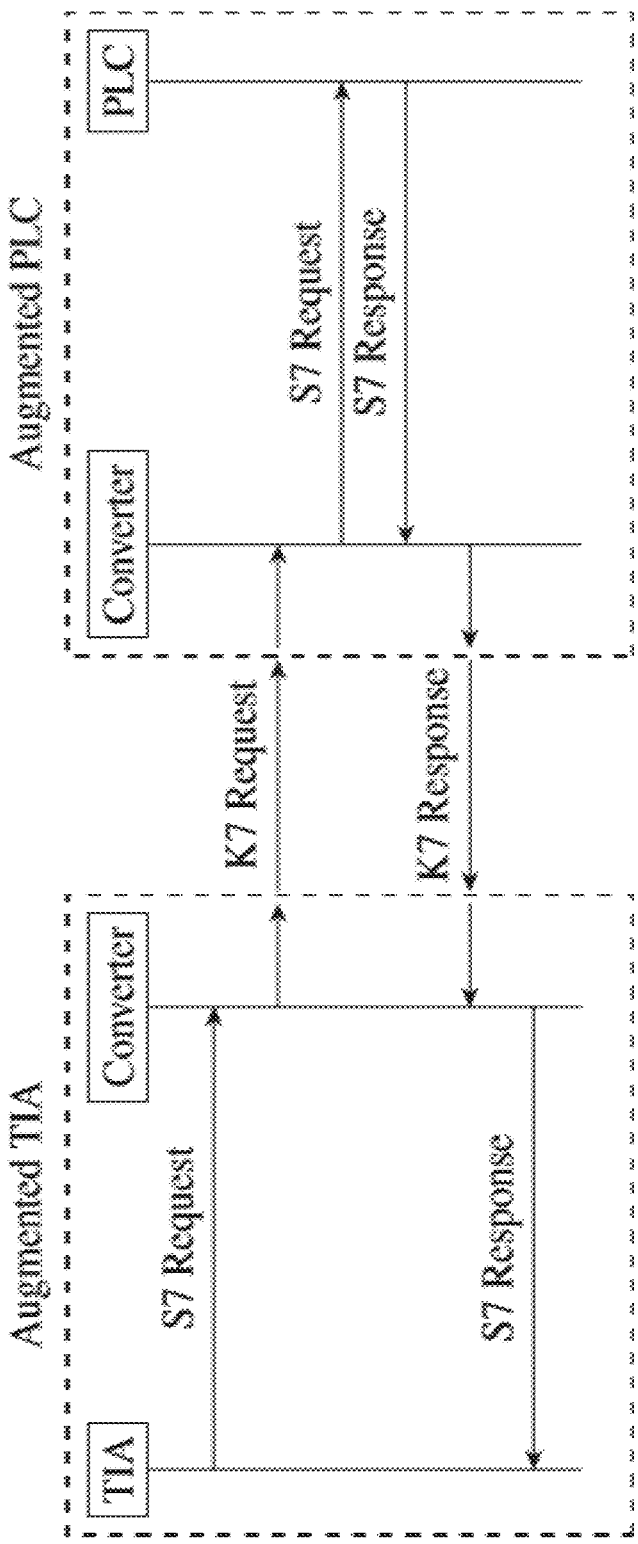
Figure 12: The Packet Flow with the Protocol Converters Protecting the S7 Communication Between the TIA and the PLC.

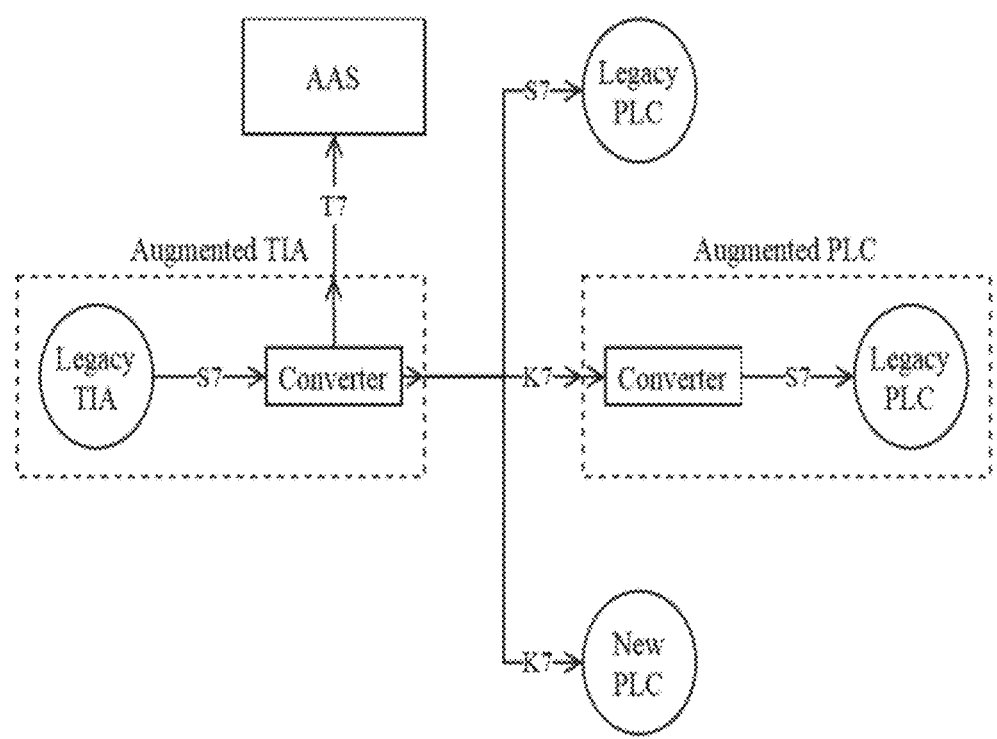
Figure 13: An Example of a Hybrid System.

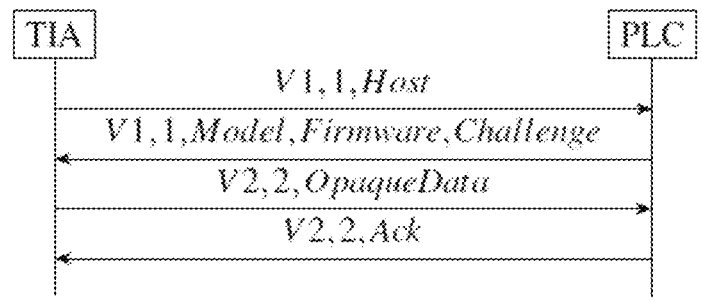
Figure 14: The S7 Communication Plus Protocol Handshake

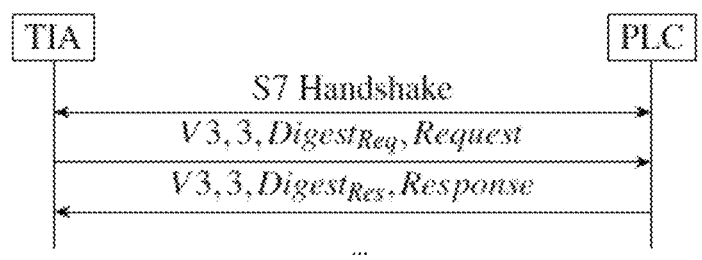
Figure 15: Siemens S7-Plus Communication Protocol

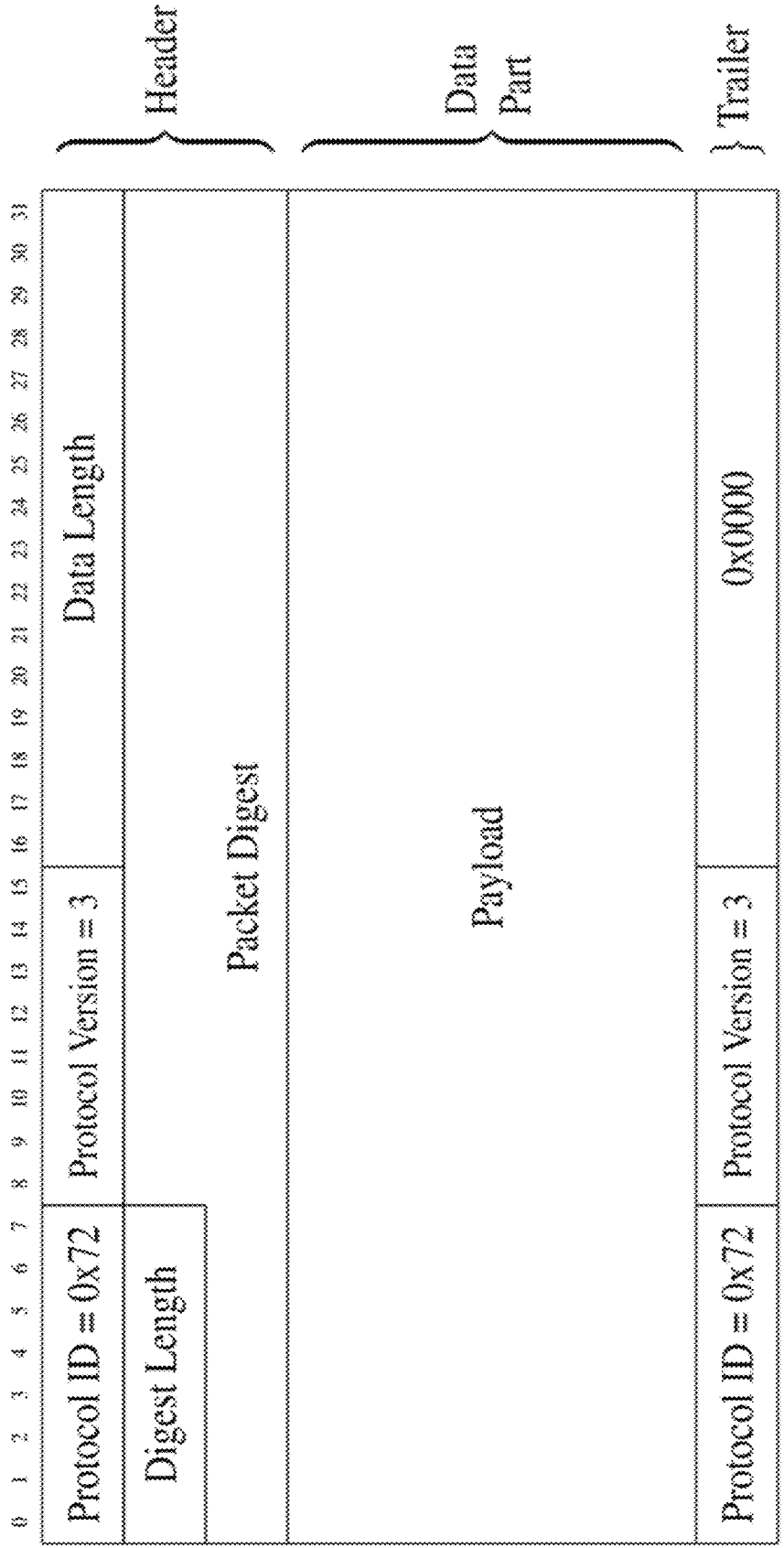
Figure 16: The Structure of an S7 Version 3 Packet.

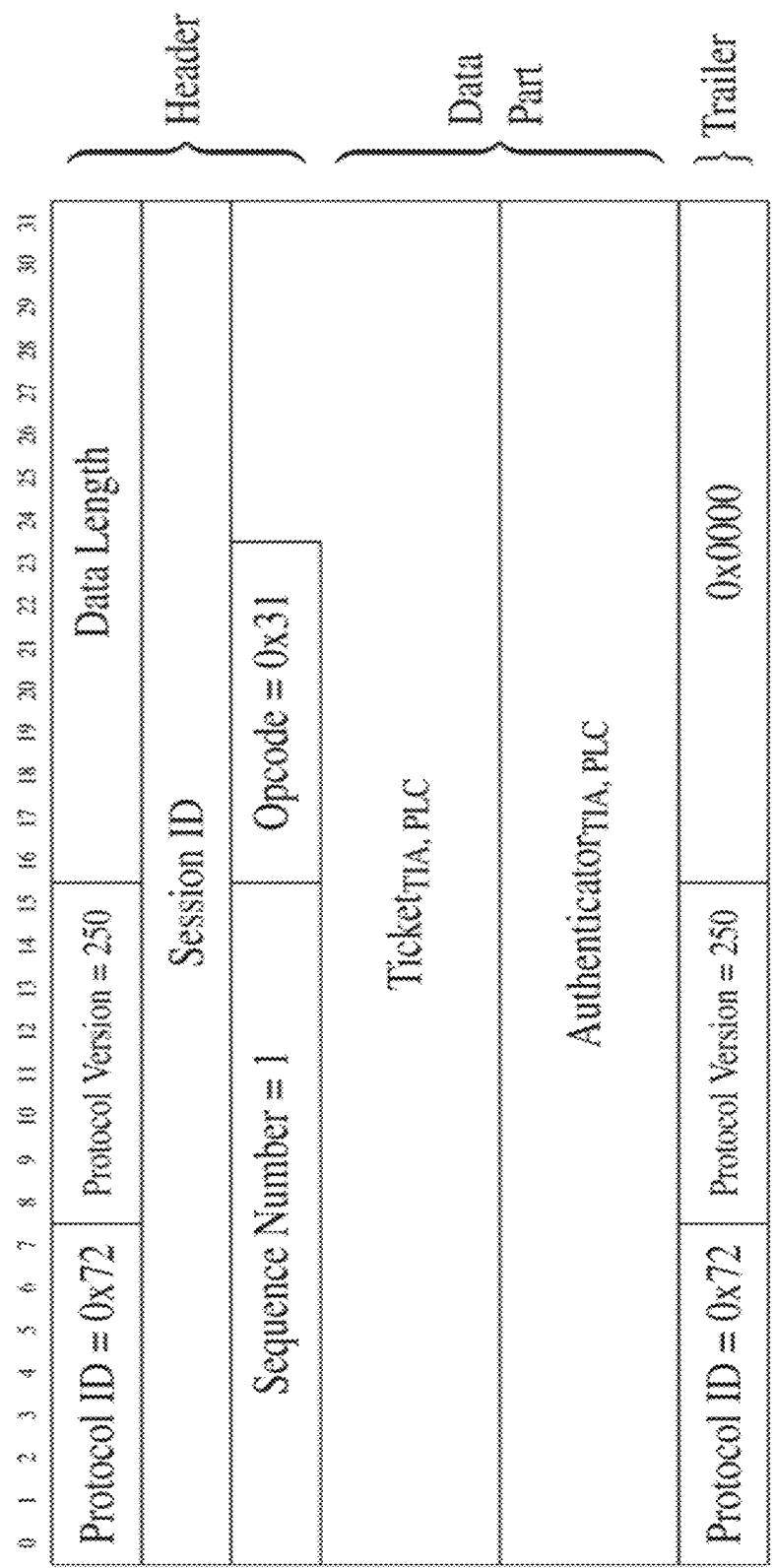
Figure 17: The Structure of the First Message in the K7 Handshake.

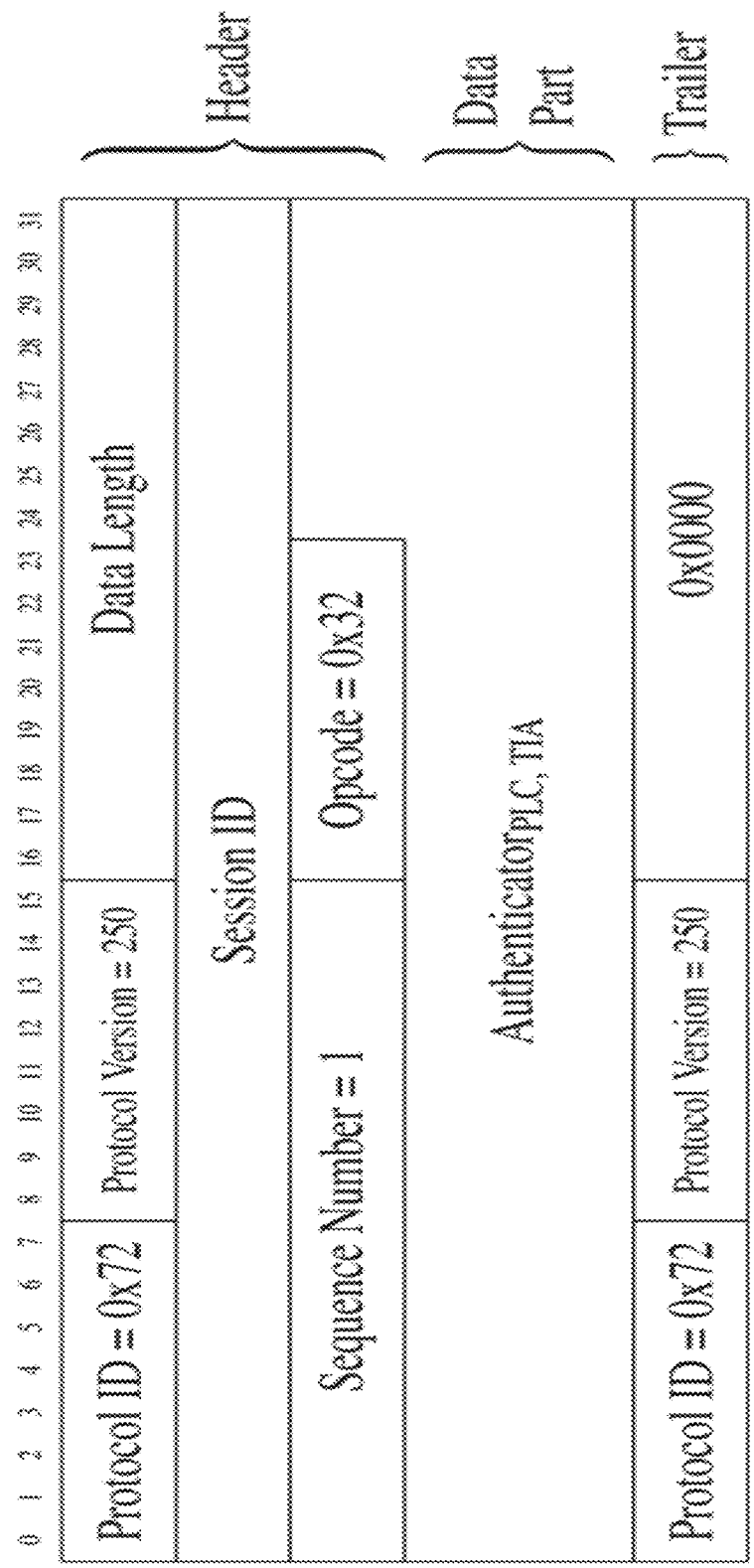
Figure 18: The Structure of the Second Message in the K7 Handshake.

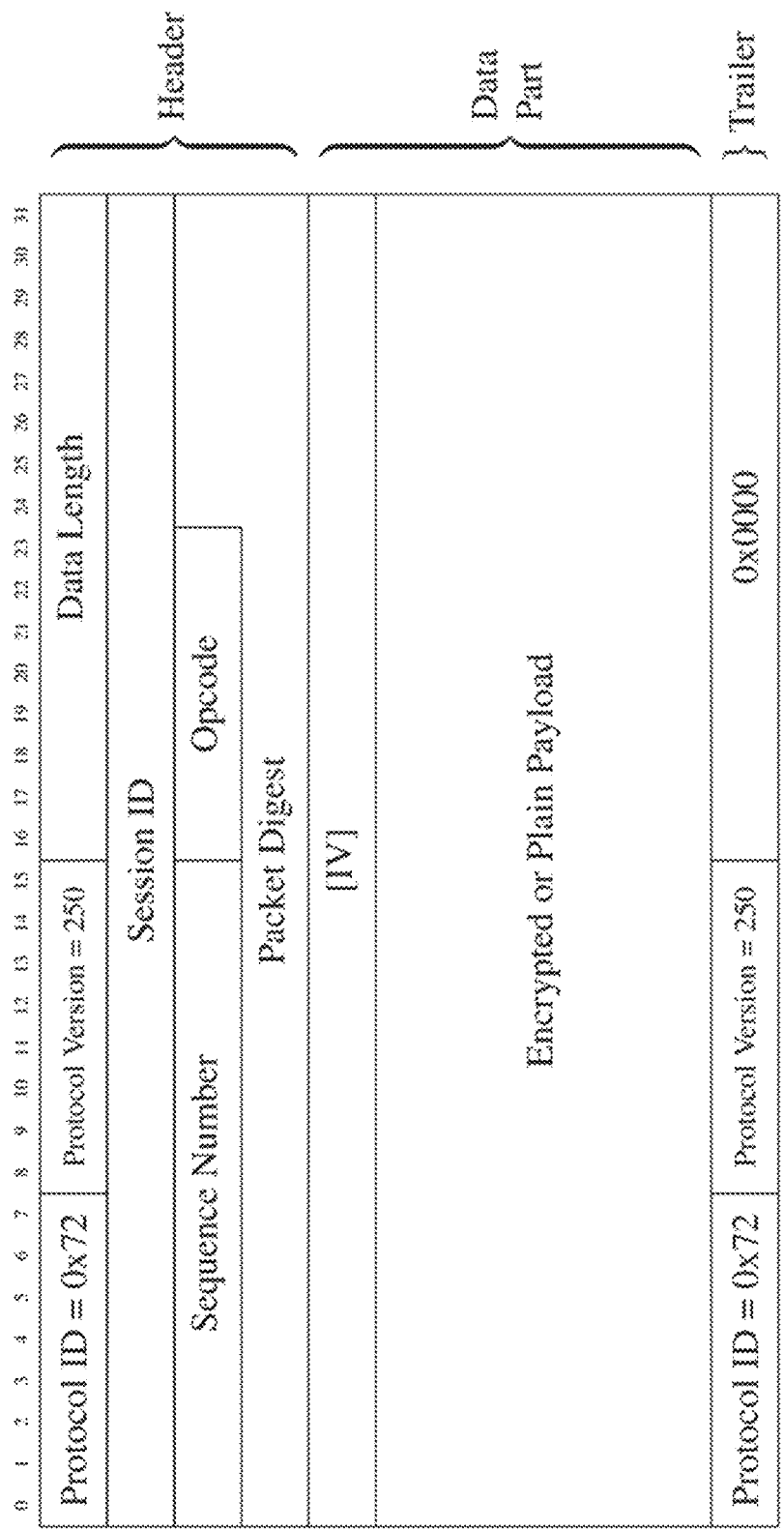
Figure 19: The Structure of a K7 packet.

US 12,047,494 B2

PROTECTED PROTOCOL FOR INDUSTRIAL CONTROL SYSTEMS THAT FITS LARGE ORGANIZATIONS

RELATED APPLICATION(S)

This application claims the benefit of priority under 35 USC § 119(e) of U.S. Provisional Patent Application No. 63/122,047 filed on Dec. 7, 2020, the contents of which are incorporated by reference as if fully set forth herein in their entirety.

FIELD AND BACKGROUND OF THE INVENTION

The present invention, in some embodiments thereof, relates to industrial control systems and, more specifically, but not exclusively, to enforcing security policies on various dedicated control operations of programmable logic control devices.

Industrial Control Systems (ICSs), also known as Operation Technology (OT) systems, may be distributed computerized systems designed to manage, monitor and control industrial processes. They may be widely used in critical infrastructures, such as power plants and water supply, whose continuous and consistent operation may be life critical.

Though their cyber protection is crucial, it did not yet reach the same level of maturity as, for example, Information Technology (IT) systems.

Following the well-known Stuxnet attack as described by Liam O Murchu Nicolas Falliere and Eric Chien. W32. stuxnet dossier. *White paper, Symantec Corp., Security Response*, 5(6):29, 2011, on OT systems, a large investment in OT security was started. However, systems may be based on security models that may not be appropriate for large organizations. For example, none of the current known models supports central management of a large number of devices with a simple authentication and authorization processes, for example, some systems require the engineers and technicians to handle thousands of passwords manually.

SUMMARY OF THE INVENTION

It is an object of the present disclosure to describe a device, a system, and a method for enforcing security policies from a policy repository on programmable logic control devices, adapted for industrial environment, suitable for systems comprising programmable logic control devices, and using tickets distributed from a central authentication and authorization service, each ticket comprising at least one of a cryptographic key and an encrypted part.

According to an aspect of some embodiments of the present invention there is provided a computer implemented method for enforcing security policies from a policy repository on programmable logic control devices, adapted for industrial environment, suitable for systems comprising programmable logic control devices, and using tickets distributed from a central authentication and authorization service, the method comprising:
 receiving a ticket at the ICS client from the authentication and authorization service, the ticket comprising:
  at least one of a cryptographic key, ICS protocol, its version, identities of participating parties and a generation time in plaintext; and
  an encrypted part which comprises at least one of a cryptographic suite, a matching session key, a ticket expiration time and a permissions of the client to perform various operations of the PLC;
 sending the control device a request from the ICS client, the request comprising at least one request instruction and the ticket; and
 verifying by the control device that the ticket is valid and that the policy repository permits the ICS client to instruct at least one programmable logic control device to execute the at least one request instruction.

According to an aspect of some embodiments of the present invention there is provided a device for transmitting supervision instructions compatible with security policies in Industrial Control Systems, comprising of ICS clients (engineering workstations and HMI servers and clients) and programmable logic control devices, adapted for industrial environment, the device supports the security policies using tickets distributed from a central authentication and authorization service, the device comprising:
 a memory storing instructions; and
 a processor operable to:
 retrieving a ticket from a central authentication and authorization service;
 transmitting an ICS client request to a device comprising programmable logic control, the request comprising at least one request instruction and the ticket retrieved from the central authentication and authorization service, the ticket comprising:
  at least one of ICS protocol, its version, identities of participating parties and a generation time in plaintext; and
  an encrypted part which comprises at least one of a cryptographic suite, a matching session key, a ticket expiration time and a permissions of the client to perform various operations of the PLC.

According to an aspect of some embodiments of the present invention there is provided a device for implementing supervision instructions while enforcing security policies in Industrial Control Systems, comprising of ICS clients (engineering workstations and HMI servers and clients) and programmable logic control devices, adapted for industrial environment, the device supports the security policies using tickets distributed from a central authentication and authorization service, the device comprising:
 a memory storing instructions; and
 a processor operable to:
 receiving a request from an ICS client, the request comprising at least one request instruction and a ticket retrieved from the central authentication and authorization service, the ticket comprising:
  at least one of a cryptographic key, ICS protocol, its version, identities of participating parties and a generation time in plaintext; and
  an encrypted part which comprises at least one of a cryptographic suite, a matching session key, a ticket expiration time and a permissions of the client to perform various operations of the PLC; and
 verifying that the ticket is valid and permits the ICS client to instruct at least one programmable logic control to execute the at least one request instruction.

According to some embodiments of the invention, the at least one programmable logic control is on a programmable logic control device, the programmable logic control device having a legacy protocol compatible therewith, and when the ticket is valid and permits the ICS client to instruct executing the at least one request instruction on at least one of the programmable logic control:

converting the at least one request instruction to the legacy protocol compatible with the at least one programmable logic control device; and transmitting the at least one request instruction to the at least one programmable logic control device.

According to some embodiments of the invention, the at least one programmable logic control is an integrated programmable logic control functionality, and when the ticket is valid and permits the ICS client to instruct executing the at least one request instruction on at least one of the programmable logic control, executing the at least one request instruction using the programmable logic control device functionality.

According to some embodiments of the invention, further comprising at least one ICS client, the ICS client having a legacy protocol compatible therewith, and further comprising:

receiving at least one request instruction from the at least one ICS client; and converting the at least one request instruction from the legacy protocol to a protocol compatible with the security policies.

According to some embodiments of the invention, further comprising ICS client functionality, and further comprising generating at least one request instruction using the ICS client functionality.

According to some embodiments of the invention, the device further comprising:

receiving a response from the device comprising programmable logic control; and verifying that the response from the device comprising programmable logic control using the ticket.

According to some embodiments of the invention, the device further comprising a long-term key associated with a client at the ICS and known to the corresponding authentication and authorization service, and transferring the session security attributes from the corresponding authentication and authorization service to the client, encrypted under the long-term key.

According to some embodiments of the invention, a policy repository contains a database of ICS clients, devices and permissions allowed by the organizational policy, and each ICS client or device record consists of an identity, and a set of long-term symmetric keys shared between the user, the ICS client, or the programmable logic control devices and the central authentication and authorization service.

According to some embodiments of the invention, the method further comprising a long-term key associated with a client at the ICS and known to the corresponding authentication and authorization service, and transferring the session security attributes from the corresponding authentication and authorization service to the client, encrypted under the long-term key.

According to some embodiments of the invention, the ticket further comprises a MAC for verification of the ticket integrity using the long term key.

According to some embodiments of the invention, preceded by sending a ticket request from an ICS client to an authentication and authorization service.

According to some embodiments of the invention, the method further comprising when the ticket is valid and that the policy repository permits the ICS client to instruct executing the at least one request instruction on at least one of the programmable logic control devices in accordance with the ticket:

converting the at least one request instruction to a legacy protocol compatible with the at least one of the programmable logic control devices; and transmitting the at least one request instruction to the at least one programmable logic control devices.

According to some embodiments of the invention, the method further comprising when the ticket is valid and permits the ICS client to instruct executing the at least one request instruction on at least one of the programmable logic control, executing the at least one request instruction using the at least one programmable logic control device functionality.

According to some embodiments of the invention, at least one long-term key is centrally set when the device is installed.

According to some embodiments of the invention, there is provided a system, comprising ICS clients (engineering workstations and HMI servers and clients) and programmable logic control devices, adapted for industrial environment, and configured to implement the computer implemented method of the present invention.

According to some embodiments of the invention, the ICS client further checks the response by validating the received authenticator.

According to some embodiments of the invention, the method further comprising at least one policy information point, wherein session security attributes are distributed via tickets.

According to some embodiments of the invention, the system, comprising:

at least one device for implementing supervision instructions while enforcing security policies in Industrial Control Systems comprising a legacy device, the legacy device is at least one of an ICS client and a programmable logic control device; and at least one device for implementing supervision instructions while enforcing security policies in Industrial Control Systems, comprising a functionality of at least one of an ICS client and a programmable logic control device.

According to some embodiments of the invention, there is provided a computer readable storage medium having instructions stored thereon, which, when executed by a computer, cause the computer to carry out the computer-implemented method of the present invention.

According to some embodiments of the invention, there is provided an integrated circuit, designed to carry out the computer-implemented method of the present invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and formulae. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic diagram of an exemplary ICS topology, according to some prior art;

FIG. 2 is a schematic diagram of an exemplary topology of an organizational ICS, according to some embodiments of the present invention;

FIG. 3 shows the structure of the protocols responsible for delivering the S7 messages, according to some prior art;

FIG. 4 is an exemplary schematic diagram of an exemplary component composition according to some embodiments of the present invention;

FIG. 5 is an illustration of an exemplary hierarchical deployment in a large electrical power company, according to some embodiments of the present invention;

FIG. 6 is a sequence diagram of an exemplary process of accessing a server, according to some embodiments of the present invention;

FIG. 7 is an exemplary encapsulation of an original vendor protocol payload, according to some embodiments of the present invention;

FIG. 8 is an exemplary structure of a ticket, according to some embodiments of the present invention;

FIG. 9 is a sequence diagram of an exemplary outline of process of handshake, according to some embodiments of the present invention;

FIG. 10 is an exemplary structure of an authenticator, according to some embodiments of the present invention;

FIG. 11 is a schematic diagram of an exemplary secure ICS system with augmented TIA engineering station and PLC, according to some embodiments of the present invention;

FIG. 12 is an illustration of the packet flow between the parties, from the TIA to the converters to the PLC, and back, according to some embodiments of the present invention;

FIG. 13 is a schematic diagram of an exemplary secure hybrid ICS system with a legacy TIA and different models of PLCs, according to some embodiments of the present invention;

FIG. 14 is an exemplary sequence diagram of a handshake including two messages in each direction, according to some embodiments of the present invention;

FIG. 15 is an exemplary sequence diagram of an exemplary protocol following the handshake, according to some embodiments of the present invention;

FIG. 16 is an exemplary structure of a payload packet, according to some prior art;

FIG. 17 is an exemplary structure of a first message, according to some embodiments of the present invention;

FIG. 18 is an exemplary structure of a second message, according to some embodiments of the present invention; and FIG. 19 is an exemplary structure of a K7 payload packet, according to some embodiments of the present invention.

DESCRIPTION OF SPECIFIC EMBODIMENTS OF THE INVENTION

The present invention, in some embodiments thereof, relates to industrial control systems and, more specifically, but not exclusively, to enforcing security policies on control and monitoring operations of programmable logic control devices.

A security architecture designed to fit large organizations, with large geographically sparse OT systems is disclosed. It supports a large number of devices in the same organization, and it controls the granular permissions given to each user or ICS client to access different PLCs. Such as organization may have several departments with their own PLCs, which may be controlled at both the departmental level and organizational level.

The disclosure comprises a secure ticket-based ICS protocol for communication between the ICS clients and the PLC, which may be referred to as the K7 protocol. The protocol protects the control information transmitted over the channel by providing integrity protection and, optionally, confidentiality. K7 utilizes tickets in order to transfer session security attributes used by the parties. The attributes include session keys, cryptographic primitives, permissions, and more.

The information and permissions of the ICS client and PLCs may be stored in a central Authentication and Authorization Service (AAS), from which it defuses to the individual devices trough the tickets. The AAS is in charge of the authorization and authentication of users and devices, as well as on generating the various cryptographic keys and capability tickets that may be needed for the system's operation. Generally, the management aspects of K7 protocol may be assigned to the central AAS. The participating parties of the protocol may enforce the security policies of the AAS by checking and verifying the tickets.

For purposes of better understanding some embodiments of the present invention, as illustrated in some figures of the drawings, reference is first made to the construction and operation of a legacy protocol as illustrated in FIG. 1, FIG. 3, and FIG. 16.

Before explaining the details of at least one embodiment of this disclosure and all its advantages, some background is provided on ICS systems, attacks against them, and existing protection mechanism.

Reference is now made to FIG. 1 which is a schematic diagram of an exemplary ICS topology, according to some prior art.

Industrial control systems may be designed to control physical equipment, which consists of input and output endpoints that monitor or execute one or more industrial processes. Motors or water pumps may be examples of output endpoints, while pressure or temperature sensors, for example within the motors or pumps, may be examples of input endpoints.

ICS systems may contain thousands of devices that perform process control tasks. Therefore, their design may be modular, with different types of components that support the different functions required in such systems. These components may be typically of three types:

Programmable Logic Controllers (PLCs) may be dedicated (relatively simple and reliable) computers used to control real-time processes. A PLC may be connected to a large number of field devices, and simultaneously monitor and control them. It periodically samples the input endpoints and operates the output endpoints according to the logic loaded by the programmer.

1. Engineering stations provide an integrated development environment to the ICS programmer, which allows them to configure, program, and debug the PLCs.

2. Supervisory Control and Data Acquisition (SCADA) machines may be a Human-Machine Interfaces (HMIs) to the ICS used by the operators. They provide real-time monitoring and control capabilities of the devices in the system. The PLCs may transmit information to ICS clients, such as HMIs, and the client may check the response by validating the received authenticator. Supervision instructions may be implemented by PLCs and ICS components in general may comprise monitoring and controlling the devices, for example receiving information for logging and various control operations such as configuration setting and reprogramming.

Large ICS systems may be typically distributed within the organization between several physical locations, which utilize different components. These may be typically divided to four levels, which follow the different equipment and function of each of them, as outlined in FIG. 1. These levels are:

1. The field level, which contains the input and output end-points.

2. The control level, which contains the PLCs. The PLCs may be physically connected on one side to the physical devices of level 1, and on the other to the clients of level 3.

3. The supervisory level, which contains the engineering stations and SCADA systems. The level 3 devices are controlling or monitoring the PLCs, and communicate either with human operators or with the HMI clients in level 4. HMI components may be typically located in two levels. A local HMI system that consist of HMI stations that connect to a small number of PLCs and may be located in physical vicinity of the PLCs and the field devices resides in the supervisory level. While central HMI system (server and clients) is located in the organizational level.

4. The organizational level contains the organizational HMI server and the HMI clients that allows the ICS operator to monitor and control the whole ICS from a single location. Notice that typically firewalls blocks all PLCs communications from reaching level 4.

In organizations that have multiple plants or production lines, multiple organizational units (OUs), may manages their own levels 1-3, while also communicating with a central organizational level 4. Traditionally, most ICS networks may be air-gapped, i.e., they may be disconnected from the Internet, or even from the main organizational network as a security measure. This might account to the fact that ICS lacks scalable security mechanisms that fit the complexity and critically levels of these system.

The disclosed architecture and protocol are exemplified by using Siemens main ICS product line, which is called SIMATIC. These examples include the S7-Simatic PLCs (e.g., S7-1200 and S7-1500), the WinCC HMI software, and the STEP7 engineering station software. WinCC and STEP7 may be packaged into the Siemens Totally Integrated Automation (TIA) portal software, which runs on standard Windows operating system, and communicates with the PLCs using a proprietary Siemens protocol, called S7. Other manufacturers may use different protocols, on which a person skilled in the art may apply a variant of the disclosed protocol.

Since the ICS servers are typically PLCs, ICS servers may be referred to by the term PLC. Furthermore, other types of field programmable or configurable devices may be referred to as PLC, and it should be emphasized that the term also comprises other programmable logic control devices usable in industrial and/or comparable systems. Furthermore, the SCADA HMIs and the user, engineering stations may be referred to as ICS clients, particularly when addressed together. All the ICS clients and servers (engineering stations, HMIs and PLCs) may be called devices. The human operator and programmer may be referred to as the ICS users.

A well-known attack on ICS systems is Stuxnet. Stuxnet is a malware that infects ICS systems, which was intended to attack the OT systems of the nuclear facility in Natanz, Iran. It attacks the engineering stations and HMIs, and gains complete control of all the PLCs in the system (mostly S7-300 PLC). For example, when a programmer tries to run a new program on the PLC, Stuxnet may stealthily alter the downloaded program so that the PLC would run the attacker's control program. Stuxnet also has a sophisticated camouflage mechanism, which displays a false state of the machines, deceitfully showing that the equipment is working properly.

Another attack was presented in Dillon Beresford, Exploiting Siemens Simatic s7 plcs, *Black Hat USA,* 16(2): 723-733, 2011. Beresford who analyzes the security of Siemens SIMATIC S7-300 PLCs (firmware version 2.3.4) and S7-1200 PLCs (firmware version 2.2). His analysis shows that the authentication of the PLCs is flawed, allowing to replay messages in order to gain access to the PLCs. As a result, an attacker may change the program loaded to the PLC, and even cause the PLC to report a false state. It is important to note that the operator would not be aware of the attack, as it is completely stealth. Moreover, an attacker may even read or write to the entire memory of the PLC, view the entire currently loaded program, and modify it to his goals.

An exemplary attack with a special interest to the disclosure is Eli Biham, Sara Bitan, Aviad Carmel, Alon Dankner, Uriel Malin, and Avishai Wool. Rogue7: Rogue engineering-station attacks on s7 simatic plcs, *Black Hat USA,* 2019. The latter exemplary attack is an impersonation of a TIA engineering station with the most updated software version (15). In this attack, the intruder sends forged commands, such as malicious program download, to S7-1500 PLCs (firmware version 2.1).

The above attacks show that ICS systems fail to have appropriate security mechanisms. Vendors and researchers suggested, however, using some existing IT technologies for securing OT. Unfortunately, these suggestions concentrate on securing the network access, without addressing the security of the application level (e.g., program download permissions). Therefore, these solutions fail to supply all the protection mechanisms needed for ICS systems.

A common technology for securing devices is passwords. For example, Siemens is using it to protect access to PLCs. In such a mechanism, each PLC is assigned with a password, and access to it is possible only using the password. This means that the engineers and technicians need to keep (and distribute) long lists of passwords, that complicate their work, and may easily leak. Even worse, in large installations of PLCs, the typical solution is to have the same password for all the PLCs due to usability reasons. From a security point of view, it is almost as bad as having no password at all. In addition, with device passwords, all users still have the same permissions over each PLC.

In order to provide better security, Schneider Electric recently added support for IPSec, described by Stephen Kent and Karen Seo, Security architecture for the internet protocol, RFC 4301, 2005. IPSec is used in recent products. IPSec is a security protocol suite that operates on the network IP layer. It provides integrity and (optionally) confidentiality. Observe that IPSec does not solve the organizational problem. For example, since IPSec has no notion of the application level structures, such as a program download message, it cannot perform any type of authorization based on the content of the messages.

Martin Naedele, An access control protocol for embedded devices. In 2006 *4th IEEE International Conference on Industrial Informatics*, pages 565-569. IEEE, 2006, addresses these problems by proposing a capability-based access control mechanism, and discusses how to implement the handshake and authentication parts of the protocol. He also claims to be able to check permissions in such a protocol. In particular, he does not address cryptographic issues, apart of selection of keys, such as choosing between alternative cryptographic suites. He only assumes that some ciphers and MACs may be used. Another major drawback is that the protocol does not support legacy system. Thus, a migration to this system requires upgrading all the PLCs at once, while shutting down the ICS during the process. This is an unreasonable requirement for large and critical ICS.

Reference is now made to FIG. 2 which is a schematic diagram of an exemplary topology of an organizational ICS, according to some embodiments of the present invention, comprising the disclosed AASs.

The disclosure comprises a proprietary security architecture, which may be based on one or more existing products, for example that of the Siemens ICS product line, which was used for an implementation of a proof-of-concept system.

Each Organizational Unit (OU) may have its local/plant level AAS, while the upper level has an organizational AAS. Thereby, the disclosed architecture supports hierarchical organizational structures. The use of a central AAS is an advantage for large organizations because it allows scalable and distributed administration of identities and permissions.

Kerberos is described in John Kohl and Clifford Neuman. The kerberos network authentication service (v5). RFC 1510,1993, and Jennifer G Steiner, B Clifford Neuman, and Jeffrey I Schiller. Kerberos: An authentication service for open network systems. In *Usenix Winter*, pages 191-202, Citeseer. The disclosure uses Kerberos with Lightweight Directory Access Protocol (LDAP) server, described in Jim Sermersheim. Lightweight directory access protocol (ldap): The protocol. (4511), as an AAS. However, the disclosed protocol may be adjusted with minor changes to any other ICS protocol or use other AAS systems (e.g., Active Directory described in Active directory domain services. https://docs(dot)microsoft(dot)com/en-us/windows/win32/ad/active-directory-domain-services, 2018.).

An industrial control system may be very sensitive in terms of the operational state of the devices. A list of requirements from an implementation of a secure and flexible ICS security system is provided:

Unique identity: In order to provide secure authentication and authorization, every user and device in the system may be uniquely identified. Therefore, the possibility to distinguish between different PLCs with different functionality or even between different PLCs with similar roles is preferred. The same holds for engineering stations and other devices.

Mutual Authentication: Mutual verification of the identities. In case one-way authentication is used, the system is susceptible to client or server impersonation.

Authorization: The goal of an authorization mechanism is to determine the actions that authenticated users and devices may perform. The mechanism may support fine-grained permissions for each user accessing a target device from a source device (e.g., start/stop the PLC, program download/upload). The authorization mechanism is accompanied by an organizational security policy, which describes the needs of the particular organization.

Central Management: A central mechanism to manage and control the users and devices of the system and their permissions.

Integrity: The parties may assure that the received data was transmitted by the authenticated party, and was not modified in transit by an attacker. Integrity prevents packet manipulation (e.g., man-in-the-middle attacks).

Replay Protection: The ability to detect or reject retransmissions of messages, which may be typically performed for malicious purposes.

Downgrade Protection: An attacker may try to downgrade the protocol version to a lower or older one in order to exploit it. This scenario is common when older protocols may be available for backward compatibility.

Confidentiality: Prevent an eavesdropper from accessing information transmitted over the channel. Confidentiality protects against theft of intellectual property or corporate secrets (e.g., industrial system software), and from understanding corporate processes.

Scalability and Fitness to Large Organizations: Support organizations that deploy several ICSs that consist of many devices as well as multiple ICS users. Typically, such organizations have many facilities and their ICSs may be distributed over a large geographical area. Due to the large number of employees, it is crucial that every user in the system will be granted with appropriate permissions that fit his needs and duties. Adding a new device, user or permission to the system may be done efficiently and may not depend, for example, on the number of devices.

Supporting Hybrid Environments: The equipment upgrade cycle in ICS may be very slow and sensitive. Hence, in many deployments, it may be typical to have hybrid environments that consist of legacy devices that might not support the new secure protocols, as well as new devices, having a functionality of either an ICS client, a PLC or both, that natively support them. A new device may be referred to as an integrated device, and natively support enforcing security policies on supervision instructions in Industrial Control Systems, supports the security policies comprise credential management, using tickets distributed from the central, organizational authentication and authorization service (AAS). Variants may apply one or more regional AASs.

In such devices, converting request instruction may refer to conversion to direct reads or writes to bits in a PLC. In order to be able to support a slow and safe upgrade cycle with fast security cycle, the system may support a hybrid environment without compromising the security.

Recoverability The ability of a system to be resilient and recover quickly after shutdown, failure or replacement of devices.

Domain Separation In real life, large organizations may be partitioned to domains or divisions, which might be owned or operated by different organizational units (OUs). An ICS security system may support complex organizational models, where each division defines its own security policy, for its subdomain.

Ease-of-use The system may be transparent to the end user, i.e., once a user is validated, his access policy to the devices is enforced by the disclosed system, without any further configurations or queries (e.g., entering the PLC's password).

Flexibility An extensible system, with the ability to add new features, and support a dynamic set of various ICS devices and operations.

Reference is now made to FIG. 3 which shows the structure of the protocols responsible for delivering the S7 messages, according to some prior art.

The Siemens S7-Plus communication protocol, presented here as an example, is a connection-oriented protocol that enables the TIA client to create and manage objects in the internal memory of the PLC. It is a request-response protocol, which establishes a secure connection between the TIA client and the PLC at the application level. The TIA client transmits requests to the PLC server, which processes them and sends the responses to the TIA. For example, WinCC may create a list of input/output PLC variables that it monitors periodically, while Step7 may create, read and modify the control program logic, which WinCC cannot access. The S7 protocol is encapsulated by ISO 8073/X.224

COTP, as in A McKenzie. ISO transport protocol specification ISO dp 8073. Technical report, RFC 905, ISO, April, 1984. COTP operates over ISO-TSAP protocol as described in Marshall T Rose and Dwight E Cass. ISO transport service on top of the TCP version: 3. (1006), 1987, which uses TCP port 102. Inside COTP come the fragments of the S7 messages (after they may be broken into fragments) encapsulated by dedicated S7 headers that, between other things, contain the authentication of the S7 fragments.

Reference is now made to FIG. 4, which is an exemplary schematic diagram of an exemplary component composition according to some embodiments of the present invention.

The main goal of the disclosed ICS architecture is to support large organizational ICS deployments securely. The architecture allows a large number of users to access a large number of PLCs through multiple ICS clients securely, and in a scalable and flexible manner Such an architecture requires an organization-wide service for authentication and authorization that gives a common base for all equipment in the organization, and that is easy to manage centrally by the OUs and the organizational security officers. For this purpose, a ticket-based security service that provides central administration and distributed enforcement of complex access control policies is disclosed.

The main operations performed under this architecture are:

1. ICS control operations, such as program download or upload.
2. Identity management: addition of new devices or users and removal of devices or users (including setup of long-term keys and of passwords).
3. Policy configuration: setting permissions for devices and users (including when a device is moved between tasks).
4. Ticket generation and provisioning (including cryptographic suite, keys and permissions for each session).
5. Access policy enforcement.

The disclosed architecture comprises the following components:

1. A new ICS protocol that supports the security requirements list. Namely K7.
2. A central Authentication and Authorization Service (AAS) that provides capability tickets for the ICS clients and the PLCs, and serves as a policy repository (PR), a decision point (PDP), and an information point (PIP). It may receive requests from ICS clients such as a work-station, a human-machine interfaces station, a higher layer supervision process, or another engineering station, using a dedicated protocol, namely T7, and responds with tickets. These requests may comprise one or more request instruction and a ticket retrieved from the central authentication and authorization service (AAS). In practice, the AAS may be based on Kerberos with LDAP or on Active Directory.
3. The ICS clients and the PLCs, which perform the ICS control operations, and implement the Policy Enforcement Points (PEPs). PEPs interfacing a PLC may be referred to a control device.

An exemplary component composition is illustrated in FIG. 4. The terms policy repository, decision point, information point and policy enforcement point follow the terminology of John R Vollbrecht, Matt Holdrege, Cees TAM de Laat, Pat R Calhoun, Leon Gommans, Stephen Farrell, Betty de Bruijn, George M Gross, and David W Spence. Aaa authorization framework. (2904), 2000. More details thereabout are provided in the disclosure.

The disclosed architecture includes a security protocol, K7. The K7 protocol is based on a protocol of a vendor, in which the security parts may be replaced by the disclosed design, while the non-security parts and the general format of the messages may be adopted from the vendor's protocol. At the beginning of each K7 session, the client and the PLC perform a handshake. The handshake may apply a protocol such as the T7 protocol described in the disclosure, in order to get tickets, provides device identification, authorization data and keys for authentication and encryption for further messages. Using the authorization data, K7 may later verify that each operation performed by the devices during the session complies with the organizational security policy.

It is important to emphasize that the architecture is demonstrated with the Siemens S7 protocol, yet the same architecture may be adapted to other proprietary ICS protocols of the competitors such as Schneider Electric or Allen-Bradley protocols, and other Siemens protocols.

The AAS may comprise a repository, a policy decision mechanism, and/or a policy distribution mechanism. A policy decision mechanism receives the identities of the client and the server (PLC) and dictates what the relevant permissions are, and which cryptographic mechanisms should be used. The new AAS may comprise memory for storing instructions and a policy repository. The disclosed AASs may be added to system or sub-systems comprising programmable logic control devices The AAS creates and distributes the security context needed for authentication and authorization in the ICS. I.e., the necessary information required to protect the communication, and device permissions during sessions. The clients and PLCs extract the permissions from the tickets and use them to check that the operations to be performed may be authorized by the policy.

The control device may be configured to receive a request from an ICS client, which comprises one or more request instructions and a ticket retrieved from the central authentication and authorization service.

The ticket may comprise an ICS protocol, its version, identities of participating parties and a generation time in plaintext, and an encrypted part, which comprises a cryptographic suite, a matching session key, a ticket expiration time, a ticket setup expiration time, and permissions of the client to perform various operations of the PLC.

Followingly, the control device may verify that the ticket is valid and that the policy repository permits the ICS client to instruct the at least one programmable logic control device to execute the at least one request instruction ICS clients retrieve the tickets from the AAS using the T7 protocol, therefore supporting the security policies using tickets distributed from the central authentication and authorization service. An ICS client may send a ticket request to the AAS. T7 and the AAS may be based on any ticket-based system and protocol. Examples of widely-deployed ticket-based systems and protocols may be Kerberos with LDAP, as described in Jim Sermersheim. Lightweight directory access protocol (Map): The protocol. (4511), and Microsoft Active Directory.

The usage of the ticket-based system by K7 may provide the following benefits:

1. Using a ticket-based system enables support of the real-time requirements of an ICS while using a centrally managed and controlled authentication and authorization system, enforcing the organizational security policy. In addition, without the need for a PLC to contact the central authentication service during the protocol, which may not be desirable in industrial settings and may not even, be possible in some configurations or geographical distributions.

2. The disclosed architecture may be adapted to support the ICS protocols of various vendors, and to every AAS that supports capability tickets. Furthermore, some alternative implementations may use additional protocols or protocol layers that support capability tickets.

3. A major advantage of the architecture is that each device is assigned a long-term key (a symmetric key, or even a public key) that is shared with the AAS when the device is first received at the organization. A major advantage in that so on-site installation and removal of devices only require configuration change in the AAS. In other words, at on-site installation (or re-installation) time, anywhere in the organization, there is no need to access the device for changing keys, passwords, or permissions.

The operations that the clients and PLCs may be performing under this architecture comprise:

1. When a client or another control machine uses the K7 protocol to request access to a specific PLC, it may need to know the permissions and the authentication information related to that PLC. The client may retrieve this information from the AAS, using the T7 protocol, by sending a ticket request.

2. The AAS generates a ticket for the client request when the policy repository permits the client, to instruct executing the at least one request instruction on the programmable logic control device. The policy decision may comprise determining the privileges a certain legitimate user has when accessing a specific PLC from a specific client. The policy repository may contain a database of users, devices and permissions allowed by the organizational policy, and each user or device record consists of an identity, and a set of long-term symmetric keys shared between the user or the programmable logic control devices and the central authentication, authorization service, and the like.

3. The AAS sends the authentication and security information to the client in a cryptographically protected capability ticket. The AAS may transmit the ticket to the requesting client. The verification of the ticket validity by the client may be performed, for example by using its shared key with the AAS.

4. Upon a K7 request, the client may verify that it has the permission to send the request, and upon every response, the client may verify that it has the permission for the received (potentially forged) response.

5. When a client attempts to access a PLC using K7, it is expected to comply with the organizational ICS policy. This may be performed by presenting a legal capability ticket, which the server (PLC) verifies, using its long-term key shared with the AAS. The PLC also verifies that it has the permission to perform the requested operations as listed in the ticket.

Reference is now made to FIG. 5 which is an illustration of an exemplary hierarchical deployment in a large electrical power company, according to some embodiments of the present invention. Notice that through these verifications the client and the PLC serve as PEPs, since they enforce the policy that appears in the capability tickets.

Many organizations have hierarchical organizational structure, where the organization consists of several OUs. the disclosed proposed security architecture supports such organizations by deploying a single organizational AAS that handles organizational level policies, e.g., users roles and OU affiliation, and multiple OU-level AASs that may be installed through the organization, and handle the OU's device policy.

The organization may have four OUs: electricity production, high voltage transportation, transference, and transportation. In this example, the main organizational AAS is installed at the company's headquarters. In addition, each OU may have its own AAS. When a user tries to access a specific PLC from a certain ICS client, it may first send a T7 message to organizational AAS and asks for a ticket to the OU AAS. The organizational AAS verifies that the user has permissions to access the OS AAS before it issues the ticket. The client then uses it to approach the OU AAS (again using T7), and ask for a ticket for the PLC.

This architecture allows for a separation of duties between the administrators in the company. In the above example, the high voltage transportation OU administrator defines and manages the policies for the devices installed in the high voltage system, while the company's administrator defines the users' rights and affiliation.

The disclosed architecture may be based on a central Authentication and Authorization Service (AAS) using capability tickets. The communication with the AAS is carried out using a ticket-based protocol supported by the AAS, which may be referred to as T7. The T7 protocol may be adapted to various ticket-based protocols, such as the Kerberos protocol or a dedicated protocol. The AAS provides the legitimate client with a pair of tickets, to which may be referred to as a client ticket and a server ticket.

The client ticket contains the necessary information that the client needs to access the PLC. The server ticket may be sent by the client to the PLC, so that the PLC will know the same necessary information. Both client tickets and server tickets may contain temporal cryptographic credentials, ICS permissions and security settings, to which may be referred to as Session Security Attributes (SSAs), for a specific session between a particular client to a particular PLC. In other words, the SSAs contain the security context of the session, including: encryption and authentication primitives, their symmetric session keys, a set of permissions, the ICS protocol and its version, a timestamp and expiration times, and other related auxiliary information. This wide variety of attributes provides extra security functionality over existing protocols. For example, in S7, the sole attribute is the session integrity key, without any attempt to support encryption, permissions or different cryptographic algorithms. The SSA may be encrypted under the long-term key.

The disclosure uses a centralized decision service rather than a distributed decision by the parties because in a large organization it may be critical to be able to implement organizational security standards that may be enforced by a single service. The AAS determines the SSAs according to the organizational security policy. The SSAs may be specifically chosen to fit the abilities and capabilities of the participating parties, while following up-to date knowledge on the strength of cryptographic primitives.

The AAS may comprise the following components:

1. Policy Repository (PR): The repository contains a database of users, devices and permissions allowed by the organizational policy. A new record may be created once a new user is added, or a new device is installed in the system. Each user or device record comprises an identity, and a set of long-term symmetric keys shared between the user or the device, for example the programmable logic control, and the AAS. The long-term keys may be set during initial device configuration. A device record also includes additional data such type (PLC, HMI, or Engineering Station), model and the services it provides (e.g., update firmware, set input variables), etc. The repository also contains information on users and clients permissions, e.g., role and organizational affiliation, and rights for accessing and performing operations of PLCs. The PR supports a wide variety of possible policies. The supported ICS protocols and cryptographic suites are then deduced from the model.

2. Policy Decision Point (PDP): When a client attempts to access a server, it sends a query to the AAS. The query may contain the identities of the user, the client and the server. The query is processed by the PDP that calculates the SSAs (e.g., the short-term session keys and the permissions), according to the security policy stored in the PR. The permissions may be stored in the SSAs.

3. Policy Information Point (PIP): It is responsible for the distribution of the session security attributes (SSAs) via tickets. It transfers the SSAs to the client at the HMI station, a computer executing a control process, or another human-machine interfaces or ICS client, encrypted under the long-term key of the client and the corresponding authentication and authorization service (AAS).

The disclosure follows the assumption that authentication is necessary in order to ensure the integrity of the messages. On the other hand, encryption may be needed only in cases that the data has to be kept confidential. Therefore, in K7, like in IPSec and other security protocols, a message authentication code (MAC) for authenticating messages is mandatory, while encryption is optional. The organizational policy may choose to use encryption, in which case, the AAS selects an encryption algorithm, generates a matching encryption key, and instructs the participating parties to use them by including them in the ticket.

The central security management by the AAS provides various advantages for large organizations. First, due to the central selection of the capability tickets by the AAS, downgrade attacks on sessions between clients and PLCs cannot be applied. Second, the security policy may restrict the use of obsolete cryptographic primitives (that were either broken or became untrusted). Third, in case the parties support more than one option for a protocol or a cipher or an authentication primitive, the AAS may choose the strongest supported option for the communication between them, according to the current knowledge of their relating strengths. In all these cases, the clients and servers outsource the responsibility of the selection of the SSAs to the AAS, and thus they may not be required to be frequently updated, or patched, with new advances on the strength of cryptographic primitives.

Notice that the disclosed architecture allows different administrators to control different parts of the system, as different servers' groups may be managed in separate AASs. For example, one AAS admin might responsible to the electrical power company's high voltage transportation's AAS, while another is responsible to the transference's AAS.

In the disclosed architecture, every client and server share a long-term symmetric key, which may be used to authenticate the owner, with the AAS. The long-term key may be centrally set when the device is installed. The access permissions of the device may be also set in the AAS by the security administrator, though they may be often assigned to groups of devices, and not to individual devices.

There may be several alternative systems that may be based on capability tickets. K7 currently supports the following ones:

1. Kerberos with LDAP: The most well-known system is Kerberos, designed at the end of the 1980's and improved afterwards. It is mainly a user authentication system, but is may be used in conjunction with LDAP to support authorization.

2. Active Directory: The most widely used competitor of Kerberos is Microsoft's Active Directory, used by Microsoft Windows domains described in Microsoft Kerberos, https://docs(dot)microsoft(dot)com/en-us/windows/win32/secauthn/microsoft-kerberos, 2018, which combines both authentication and authorization. It provides the same properties of Kerberos with LDAP, and extends them with more features, such as role-based access control.

3. Dedicated System: Some embodiments also comprise a ticket-based system, which allows providing the required features with a very short and flexible code. It is especially suitable for either debug purposes or small organizations.

Kerberos is provided as an example, in order to give the reader the ideas and terms of capability-ticket based systems. Kerberos is an authentication protocol that is based on tickets and temporary sessions keys that may be supplied by dedicated network service, called Key Distribution Center (KDC). Kerberos defines two types of KDC servers, an Authentication Server (AS), that supplies tickets to the Ticket Granting Service (TGS), and a TGS that supplies tickets to server principals. Sometimes, the AS and the TGS run on the same physical server.

Kerberos realm (i.e., the OU or domain of the principals) typically contains a single AS and multiple TGSs. Kerberos supports cross-realm authentication and authorization. Client principals share a long-term key with the AS ("the client key", KClient), while server principals share a long-term key with their TGS ("the server key", KServer). The client key is commonly the hash of a password. Tickets may be encrypted under the keys shared between the receiver of the ticket and the KDC.

Reference is now made to FIG. 6, which is a sequence diagram of an exemplary process of accessing a server, according to some embodiments of the present invention.

When a client wants to communicate and access a server, the client follows the protocol outlined in FIG. 6.

In the message exchange, the client authenticates his identity to the AS. The AS generates a session key for the client and the TGS. The AS encrypts this key under the client's key. It also generates a TGS ticket, which contains the key, its validity period and other information for the handshake. The ticket is encrypted under the TGS's key. Then, the TGS sends the encrypted key and the ticket to the client. As long as the ticket is valid, the client and the TGS may communicate with the session key in the ticket.

The client receives the encrypted key and the ticket. It decrypts the encrypted key with his key and obtains the session key. The client then sends a TGS request, which contains the ticket he received, the identity of the server he wishes to access, and an authenticator. The authenticator includes his identity and an encrypted timestamp encrypted under the session key that he extracted from the ticket.

When the TGS receives the message, it decrypts the ciphertext of the ticket with his key and obtains the session key. The TGS verifies the authenticator using the session key from the ticket. If the verification is successful, then the TGS generates a new session key and a ticket for the server that contains it. The new key is encrypted under the symmetric key of the client and the TGS. When the client receives the response, it obtains the generated key and verifies the nonce.

The client and the server maycalculate the generated session key. For this purpose, Kerberos, for example, defines a message exchange.

The K7 protocol is disclosed for ICSs that fits the needs of large organizations. The K7 protocol may support the operations of ICS systems to operate PLCs, and interface with engineering stations and HMI. Furthermore, the K7 protocol is designed with security in mind. K7 is general in nature, and may be applied to a wide family of ICS protocols of many vendors, featuring a variety of capabilities and capability tickets. It supports all features of proprietary vendor ICS protocols by encapsulating the vendors' payloads in a generic K7 message. The K7 protocol may also integrate different capability tickets protocols.

The main advantage of K7 is its security aspects. The K7 protocol provides a rich set of security features, including authentication, authorization and key management. The protocol supports a variety of expressive and granular security policies, which may be so missing in existing ICS protocols. The central management of the underlying ticket-based system makes it highly flexible and easy to manage, which in turn makes it especially attractive for large organizations.

Reference is now made to FIG. 7 which is an exemplary encapsulation of an original vendor protocol payload, according to some embodiments of the present invention.

For the sake of concreteness, an exemplary embodiment description of the protocol on a version based on the Siemens S7 ICS protocol is provided. Some embodiments may base the format of the K7 messages on the message formats of Siemens for all non-security-related data without their encapsulation (see FIG. 7, where the original vendor is Siemens). However, the security information as well as the security verification may be handled directly by K7 with dedicated wrapper formats, dedicated handshakes and special codes to handle the cryptographic verification.

In the following subsections a high-level view of the protocol, and then elaborate on the main parts of K7 is provided.

The K7 protocol may comprise the following components:

1. The ICS control information uses the original vendor's payloads, while keeping their message format, and removing their encapsulation (i.e. headers and trailers).

2. The ICS control information is encapsulated by K7's headers that provide a secure channel for the ICS data (see FIG. 7).

3. At the beginning of the session (and whenever the ICS protocol asks for) a dedicated handshake is performed, which identifies both parties to each other, and provides the SSAs.

4. During the handshake, the client accesses the ticket-based system (the AAS) in order to get the client and server tickets, which contain the SSAs. The client sends the server ticket to the server during the handshake, so that both parties have the same SSAs at the end of the handshake.

5. After the handshake, the parties use the SSAs to authenticate and encrypt the messages. They also enforce the access permissions specified in the SSAs.

For supporting the security features required for a secure ICS protocol, the protocol may provide identification and authentication of users and devices, and enforcement of each party privileges to perform operations on others. Since K7 is aimed to provide security for large organizations, it needs a central management of the users, devices and permissions, which may be done by the AAS and the T7 protocol.

Reference is also made to FIG. 8 which is an exemplary structure of a ticket, according to some embodiments of the present invention.

The information that the AAS provides to the parties comprises a list of SSAs, as dictated by an organizational security policy, that the parties use for securing sessions and enforcing the authorization policy. The SSAs may be enclosed in tickets, which provide the ability to send the SSAs to and between the parties securely in an encrypted and authenticated form. The content of the T7's tickets is illustrated in FIG. 8. From top to bottom, consists of the ICS protocol and its version, the identities of the participating parties and the generation time. All these SSAs may be sent in plaintext and authenticated by the ticket MAC. Encryption of the following SSAs may require an W, which may be added at the beginning of the encrypted part. The encrypted part contains the cryptographic suite (cipher and MAC primitive for the session), the matching session keys (encrypting and authenticating the session) as well as the ticket expiration time and the permissions of the client to perform various operations of the PLC.

Both the plaintext part and the encrypted part may be authenticated and the resulting MAC value may be assigned into the last entry. Therefore, the ticket may comprise a MAC for verification of the ticket integrity. Verifying the ticket integrity using MAC may be done by a cryptographic checksum, or a more complex verification method. The MAC may be used for verification of the ticket integrity, using the long-term key. It should be emphasized that the keys used for authenticating and encrypting the ticket may be the keys shared in advance between the receivers of tickets and the AAS. The keys that reside inside the ticket may be used by the two receivers to encrypt and authenticate the sessions between them.

In order to start a secure communication session with a certain PLC, the client may provide a capability ticket for this PLC. Acquiring the ticket may be performed by turning to the AAS using the T7 protocol, which responds with the ticket: (1) The client requests a ticket for a session with a certain PLC from the AAS (in particular, from the PIP). (2)

The PIP consults the PDP to receive the SSAs. (3) The PDP contacts the PR to receive the relevant information on the participating parties (e.g., the supported cryptographic primitives and the access control information). (4) The PR responds to the PDP with the requested information. (5) The PDP calculates the SSAs from the response. It generates the required cryptographic keys, determines the ICS protocol and the cryptographic primitives, and sets the permissions for the specific session. (6) The PIP encapsulates the SSAs within a client ticket and a server ticket. It then sends the tickets to the client.

Reference is now made to FIG. 9, which is a sequence diagram of an exemplary outline of process of handshake, according to some embodiments of the present invention The K7 handshake is a ticket-based protocol that is used to authenticate the parties, and to agree on common SSAs including shared keys. While S7 performs a four-message handshake, the K7 protocol performs a two-message handshake between the client and the server.

Reference is now made to FIG. 10, which is an exemplary structure of an authenticator, according to some embodiments of the present invention.

An authenticator is the digest of the identity of the sender and the timestamp under the symmetric session key of the parties. The authenticator may comprise an identifier of the protocol and the protocol's version, its client ID, the ID of the PLC to be accessed, a timestamp, an authentication MAC, and/or the like.

Referring to the handshake which is outlined in FIG. 9.

1. Once the client has the pair of tickets (as described previously), he verifies and decrypts his own ticket to get the SSAs. The client checks that the properties of the encrypted data fit his request (e.g., the permissions may be correct). If the ticket and the SSAs may be found valid, then client stores the SSAs, and starts the session with the PLC.

2. The client generates an authenticator and sends it to the PLC along with the PLC ticket.

3. The PLC verifies his ticket and extracts the SSAs. The PLC validates the authenticator of the client. If the PLC fails to verify the authenticator, or if any other error occurs (e.g., parse error), then it sends back an error message and discards the connection. Otherwise, the PLC stores the SSAs, which include among others the client's permissions in the current session.

4. The PLC then generates an authenticator and transmits it to the client.

5. The client checks the response by validating the received authenticator. If the validation of the authenticator fails, or if any other error occurs, the client sends back an error message and discards the connection.

After the handshake, both parties know each other's identity and share keys and common SSAs. In contrast, in the S7 architecture, for example, PLCs may be indistinguishable from each other, since they may be identified by their type and version and authenticated using the same private key.

The client and the PLC share the SSAs as a result of the handshake. The session keys may be used for authentication and (optionally) encryption of the following messages of the K7 protocol. The cryptographic primitives used for authentication and encryption may be determined during the handshake (through the ticket) according to the policy.

When the client sends a message to the server, they follow the protocol:

1. The client checks that his request is authorized by the SSAs of the ticket (e.g., a program download request).

2. If it is, the client generates his K7 request packet for the PLC. I.e. the control information is generated.

3. In case encryption is performed, the client encrypts the data part (without the header and the trailer) under the symmetric encryption key using the agreed encryption primitive from the SSAs:

EncryptedData=EncryptEncKey([IV],Data).

If the cipher requires an IV, the sender generates it randomly and includes it at the beginning of the ciphertext.

4. The data part is encapsulated by K7. The encapsulation adds a K7 header and a K7 trailer.

5. The client computes the packet digest on the packet (which includes the header, the optionally encrypted data and the trailer, while the packet digest is zeroed). It is calculated under the symmetric integrity key and the Message Authentication Code (MAC) primitive from the ticket:

PacketDigest=MACIntKey(Header Data Trailer).

The disclosure uses the encrypt-then-authenticate mode.

6. The packet is transmitted to the PLC, thereby the request instructions may be transmitted to one or more programmable logic control devices 7. The PLC keeps the packet digest and zeroes it. Then, it authenticates the packet and compares the result to the saved packet digest. If the authentication fails, or if any other error occurs, the PLC sends back an error message and closes the connection.

8. The PLC decrypts the data part of the message and parses the control information.

9. The PLC checks that the client has the appropriate permission for the requested operation according to the SSAs. Thus, the PLC enforces the security policy. If the PLC receives a forbidden request, it sends an error message and discards the connection.

10. If the request is permitted, the PLC performs the operation and generates the protected response as the client did. The response may be received by the ICS client and verified using the ticket retrieved from the AAS.

Particularly, the client does not perform any operation based on responses from the PLC that it has no permission to receive or to perform. However, when the ticket is valid and that the policy repository permits the, ICS client, the user, or another HMI station to instruct executing the at least one request instruction on at least one of the programmable logic control devices in accordance with the ticket, the device or integrated device may execute the instruction.

Therefore, the PLC is configured for receiving requests from one or more ICS clients, which comprises at least one request instruction and a ticket retrieved from the central authentication and authorization service. The ticket may comprise a cryptographic key, ICS protocol, its version, identities of participating parties and a generation time, which may be sent as plaintext, and an encrypted part which may comprise a cryptographic suite, a matching session key, a ticket expiration time and a permissions of the client to perform various operations of the PLC.

The PLC may verify that the ticket is valid and permits the ICS client to send the request instruction, and the programmable logic control functionality may execute the request instruction.

Notice that some embodiments do not encrypt the session ID and the sequence number in order to be able to drop erroneous messages without decryption of the ciphertext.

To prevent various replay attacks, the K7 header includes a session ID, a sequence number and an opcode (which indicates the direction of the message):

Header=ProtocolID, ProtocolVersion,DataLength, SessionID, SequenceNumber, Opcode.

The disclosure protects every fragment of the message (rather than every message) to avoid delay of detection of integrity errors. Variant protocols, derivable by a person skilled in the art, may verify the integrity at message level, group of messages, or sessions. If the integrity protection of one of the packets, in some message, is invalid, K7 closes the connection without waiting for the rest of the message. For comparison, legacy versions of S7 authenticate full messages, with a single MAC at the end of the message.

The content of the control messages (i.e., the data part) may be based on the S7 messages. Therefore, the interpretation of the data, which is performed by the clients and the PLCs, is unmodified.

As a part of the architecture, applied in the proof-of-concept system, the disclosure defines a new type of device, which may be referred to as an augmented device. An augmented device may comprise one or more Protocol converters, which control the device and convert the proprietary PLC protocol (e.g. S7) used by one or more legacy devices to the K7 protocol, and vice versa. Device augmentation enables to provide authentication, authorization and secure communication (authentication, integrity, confidentiality and replay protection) to both legacy and updated devices from a single AAS.

The augmented device, which may be a TIA engineering station, or a PLC, comprises one or more protocol convertors, and one or more legacy device. Transactions may be initiated by the ICS client, and responded to by one or more PLCs, which may be adapted for industrial environment.

One of the things characterizing OT systems, as opposed to IT system, is the low update and upgrade rate. Hence, one of the requirements from an ICS security model is to support hybrid systems that consist of legacy as well as up-to-date ICS devices. The disclosed solution supports hybrid systems since the augmented devices, comprising a legacy device and a K7 supporting protocol converter, may communicate with three types of devices: legacy devices, augmented devices, and new devices that support K7. Another major advantage is that the transition from an existing system to a new one using protocol converters may be much easier than a full replacement of all the equipment overnight.

The disclosure also comprises the K7 protocol with augmented devices, which comprise legacy devices, encapsulated by protocol convertors that upgrade the legacy protocol into K7. The legacy device may have a legacy protocol compatible therewith, such as S7. The combination of the legacy devices with the converters as new devices, namely augmented devices is disclosed. The resulting augmented devices are equivalent to new devices that support K7, while protecting the legacy devices from being directly accessed from outside. The users and physical equipment may interact through the augmented HMI, augmented engineering station, or augmented PLC, which in turn may be presented to the users or equipment through the corresponding legacy devices. The converters may be connected to the network, while the PLC may not, so that the legacy devices are protected from external attacks. The legacy device may be restricted to communicate only with the converter, while the converter has two interfaces, one connected to the legacy device, using a legacy protocol, and the other one is connected to the network, using K7 to communicate with other devices. For example, we describe a prototype of augmented devices, based on Siemens devices with protocol converters that convert between S7 and K7.

Reference is now made to FIG. 11 which is a schematic diagram of an exemplary secure ICS system with augmented TIA engineering station and PLC, according to some embodiments of the present invention.

An augmented device is considered as a single functional device that communicates by K7, and that in order to save the huge effort of implementing fully functional complex ICS devices, contains an existing ICS devices internally. Though an augmented device combines a legacy device and an augmenting device, or a protocol converter, it is considered a single device. The consequence is that the converter may be able not only to communicate with the internal legacy device, but also to fully control it, if it wishes to. Furthermore, possible adversaries may be assumed to have no access to the internal connections within the augmented devices.

For these purposes, the protocol converters for engineering and HMI stations and PLCs are disclosed, so the protocol converters convert messages between the K7 protocol and legacy ICS protocols such as S7. The augmented devices communicate with each other using K7. The protocol converter relays the messages between the two interfaces while translating between the legacy protocol and K7.

Reference is now made to FIG. 12 which is an illustration of the packet flow between the parties, from the TIA to the converters to the PLC, and back, according to some embodiments of the present invention.

The conversion may comprise converting request instruction to or from a legacy protocol to the K7 protocol, which is compatible with the security policies. When a TIA (as an example for any engineering or HMI station) sends a message, the protocol converter of the TIA decapsulates the legacy protocol packet, and encapsulates the data in a K7 packet. When the protocol converter of the PLC receives the request, it converts the request back to the legacy protocol. The conversion may comprise decapsulating the K7 packet and encapsulating the payload, comprising the request instruction, by the legacy protocol. Transmission of a packet from the PLC to the TIA is similar. In all cases, the converters verify the authenticity of messages they receive, check for permissions if needed, and perform authentication for the outgoing messages, as required by the legacy protocol such as S7, or the K7 protocols.

The handshakes of the legacy protocol and K7 may be different, and therefore require a special handling. The protocol converters communicate with their devices using the legacy protocol such as S7 protocol, in which they may agree on a session (integrity and any other) key. Unfortunately, between all the security features of the exemplary S7 handshake, it is in charge of verifying that it communicates with a valid device, in particular one manufactured by Siemens. The disclosed converter may not follow this requirement (as it is not manufactured by Siemens). Fortunately, the exemplary attack as described in Biham et al 2019. showed how to perform exactly this operation by a dedicated impersonation attack. Thus, an attack, based on the exemplary attack of Biham et al. may be applied to systems such as Siemens systems to implement the converters by impersonating the TIA and the PLC in order to let the protocol converters successfully communicate with them. Some of their attacks may require tampering of the legacy TIA. This is not a security problem, as the legacy TIA is an internal part of the augmented device, protected by the augmenting device. In commercial converters, the vendor may supply the necessary keying information to the converter to allow it to be a legitimate party in the legacy protocol.

The disclosure also comprises a dedicated T7 protocol and a dedicated AAS. An implementation of another T7 variant based on Kerberos and LDAP, which may be configured using the standard Kerberos and LDAP configuration tools is disclosed. Both versions may be compatible, and may be used with the disclosed implementation of K7 with the augmented devices.

Hybrid System Architecture

In real life, organizations maintain a hybrid ICS system, with a mix of new-technology devices and legacy devices. Over time, new devices may be purchased for new applications as well as for replacing older devices, which may be slowly retired. During the process of replacement, new and legacy devices may live together, and even communicate. This is not easy, as their security features may be different, and as it is not a good strategy to let two devices to decide on their security feature by themselves. E.g., old devices might use an already broken cryptographic primitive, and new devices would be forced to use an old, less secure protocol when communicating with old ones. In addition, even a pair of new ones may use a cryptographic suite that is not included in the current organizational policy because they select it at run time without an option to configure it by the security administrator.

Organizations may face a need to replace full systems together. Replacements of full systems together may be much more complicated and costly, both because of the advance planning and early purchasing (with old devices retired before their real end-of-life), and because replacement of full production lines requires their closure for the replacement period, until the new equipment is installed and checked. The disclosure may enable gradually replacing each device when it comes to age or when convenient to the organization.

Reference is also made to FIG. 13 which is a schematic diagram of an exemplary secure hybrid ICS system with a legacy TIA and different models of PLCs, according to some embodiments of the present invention.

The disclosed solution to this problem supports hybrid systems without compromising the security, using device augmentation. In this solution, each legacy device is augmented with a converter, which communicates to the network by K7, and protects the legacy device from illegal network access. Protocol converters allow the legacy and the new devices to communicate securely over the network. Additional, new clients and PLCs which support K7 directly. The PLCs directly supporting K7 may be developed in the future, and the scope of the terms device, client, and the like is intended to include all such new technologies a priori.

A K7 supporting device, having an integrated programmable logic control functionality, may receive request from a K7 supporting, or an augmented ICS client or TIA a request, verify that ticket is valid and permits the ICS client to instruct executing the requested instructions on the programmable logic control device functionality, and execute the requested instruction following the verification.

An ICS client may support K7 and natively retrieve tickets from the AAS and generate K7 compatible request instruction using the ICS client functionality.

Replacing the existing infrastructure with a new and secure one may be a slow and sensitive process. Device augmentation offers a staged migration process, and converters for hybrid systems work as follows:

(a) PLC converters work as in the proof-of-concept, i.e., converts the legacy protocol to K7 and vice versa. Any other communication is discarded.

(b) An ICS client protocol converter may receive request instructions from one or more ICS clients, and convert the request instructions to K7, or a legacy protocol, while maintaining the security policies. The ICS client converters support two modes: In the first mode, they convert the legacy protocol to K7 as in the above implementation, while in the second mode they transparently transfer the legacy protocol to support communication with legacy PLCs. The selection of the mode is made via the AAS, and the selection is sent to the devices within the tickets. This way, the devices may continue to use the legacy protocol without further changes, when they contact legacy PLCs, and use K7 otherwise.

2. First, the AAS is configured with all legacy PLCs, marked as supporting the legacy protocol.

3. Then, the organization installs protocol converters at a slow rate. Converters may be installed for few engineering stations, and the AAS is configured with their data, marking them as supporting both the legacy (e.g. S7) and K7 protocols. It is also configured to allow them to communicate with the devices they need. At this stage the system may continue to use the legacy protocol.

4. Later, some of PLCs that communicate with these stations may be augmented with converters, and the AAS is updated to mark them as using (only) K7. At that moment these stations and these PLCs start to communicate by K7 through the converters. Since the augmentation may be performed for a single (or a few) devices at a time, it is easy to replace and check without interrupting the full production line.

5. Once a few devices may be augmented successfully, the organization augments more stations, HMIs or PLCs, potentially one at a time, slowly migrating to use K7.

6. At any time during the migration, new devices that natively use K7 may be installed (without need for converters). They may communicate with any augmented or new device, as allowed by the policy of the AAS.

7. In addition, at any time augmented devices may be replaced with new ones with a minimal effect on the working system.

As a result, K7 with augmentation of legacy systems may enable a gradual upgrade, without need to shut down systems. Another advantage of device augmentation is that a legacy device may be replaced only when it breaks down, which is a financial consideration as well.

This disclosure exemplifies a new architecture for ICS systems, which supports the various requirements of large organizations, such as hierarchical organizations (with multiple organizational units, and central and distributed management), ability to move a device between tasks or units without the need to set it's master key again, transparent session key exchanges where the operator does not need to know the keys or passwords, and transparent and centrally managed permission management.

A major feature of this architecture is its ability to support co-existence of legacy devices and new devices, while all use the K7 protocol, either natively, or by a connected converter. This co-existence allows organizations to gradually switch from a fully-legacy ICS to a fully-new K7-based ICS by replacing a single (or a few) devices at a time. In particular, production lines that would otherwise have to be closed for the duration of the replacement by a new system, possibly for months, may gradually be upgraded without interruption. The new architecture is highly flexible. As such, the K7 protocol may be extended with new features, and in particular, the security features of the protocol may be further extended. For example, it is possible to easily add support for new cryptographic primitives, or even to add support for new features such as asset management or attestation.

The architecture, as described, assumes that the network is always on. However, in case of network (or components) failures, the PLCs may continue to work, and control the physical devices, as long as needed. If parts of the network may be still connected, existing sessions (and new sessions with already existing ticket) may still work. New sessions between devices that may be not currently communicating may not be needed at this case, as the network may be unable to retransmit packets. However, if such a property is needed, it is not difficult to modify the disclosed architecture to allow it (e.g., by setting tickets early and use them later, or by adding new types of tickets especially for this purpose).

The disclosed system may use protocol converters, which convert between the legacy protocol and the K7 protocol, and allow an efficient transition to the disclosed new infrastructure. This implementation may require the converters to impersonate other devices (PLCs to the clients, or clients to the PLCs) if the converter vendor is not the legacy vendor. The disclosed implementation includes three alternative implementations of ticket-based authentication and authorization system, a dedicated one, one that uses Kerberos with LDAP (and thus that uses the Kerberos and LDAP administration tools for its configuration), and a third that uses Active Directory (and its administration tools).

In order to emphasize on the simplicity of configuring a device in the disclosed architecture, a description of the settings required for a device to be newly installed, moved, or retired is provided. The setup of new devices, when they may be first enter the organization, only requires to configure them into the AAS, with a shared long-term key. Then, whenever a device is physically installed in a particular department, its permissions may be selected by the security administrator, and updated in the AAS, to fit those required for its tasks. A device may be moved to another department, in which case its permissions may be updated in the AAS. The security administrator may also modify the permissions at any required time, as may be needed by the tasks it may perform. Retiring a device is performed by removing its record from the AAS. In all these cases of physical installation, moving, or retiring, the administrator has no need to access the device, or change any of its keys. Once the new permissions may be set in the AAS, it will automatically perform correctly whenever the next session is started.

The disclosed protocol supports unique identity, mutual, authorization, central management, integrity, replay protection, downgrade, confidentiality, scalability and recoverability.

It should be emphasized that the protocol details are provided as an example, and a person skilled in the art may apply the disclosure on different protocols. Industrial control systems have several communication protocols, including a protocol for the PLC to communicate with the field devices (which is out of scope) and a protocol for the ICS client (engineering station, HMI client and HMI server) and PLC communication. The latter is used for PLC configuration and monitoring. Each vendor has a proprietary communication protocol. Siemens' protocol for communication between the ICS client and the PLC is called the S7 protocol. An additional version of the S7 protocol, namely S7-Plus, may also be used.

The Siemens S7-Plus communication protocol is a connection-oriented protocol that enables the TIA client to create and manage objects in the internal memory of the PLC. It is a request-response protocol that establishes a secure connection between the TIA client and the PLC at the application level. The TIA client transmits requests to the PLC server, which processes them and sends the responses to the TIA. For example, WinCC may create a list of input/output PLC variables that it monitors periodically, while Step7 may create, read and modify the control program logic, which WinCC cannot access. The S7 protocol is encapsulated by ISO 8073/X.224 COTP described in A McKenzie. ISO transport protocol specification ISO dp 8073. Technical report, RFC 905, ISO, April, 1984. COTP operates over ISO-TSAP protocol, described in Marshall T Rose and Dwight E Cass. ISO transport service on top of the TCP version: 3. (1006), 1987, which uses TCP port 102. FIG. 3 shows the structure of the protocols responsible for delivering the S7 messages. Both protocols transfer data as plaintext.

Reference is now made to FIG. 14, which is an exemplary sequence diagram of a handshake including two messages in each direction, according to some embodiments of the present invention.

The S7 protocol starts with a four-way handshake. At the end of the handshake, the parties agree on a shared secret session key, which is used to authenticate the rest of the messages in the session. The handshake includes two messages in each direction, as outlined in FIG. 14. The full analysis of the handshake may be found in the exemplary attack of Biham et al 2019.

The first message is a hello message sent by the TIA to the PLC. It contains details about the host, such as the host name, and states its intention to initiate a session with the PLC. The PLC responds with a message that contains his model, firmware version and random session ID and challenge. The TIA uses the challenge to generate a 24-bytes session key.

The session ID, together with the sequence number, identifies a specific message in a specific session, respectively.

In the third message of the handshake, the TIA transfers an opaque data structure to the PLC. The data structure includes the session key encrypted with the PLC's public key, and an additional field that depends on the keys and the challenge, and proves the integrity of the exchange. When the PLC receives the message, it uses its private key to decrypt the session key and verify the message integrity. If the third message is verified successfully, then the PLC responds with the forth message, that contains an acknowledgement.

When the exchange is completed, the parties share a session key, which is used to generate the message integrity protection. Every message is authenticated using HMAC-SHA256, as the S7 protocol uses HMAC-SHA256 incorrectly, see Eli Biham, Gal Benmocha, and Stay Perle. Draft paper, private communications. 2019.

Reference is now made to FIG. 15 which is an exemplary sequence diagram of an exemplary protocol following the handshake, according to some embodiments of the present invention. When the TIA or the PLC generates a message, it calculates HMACSHA256 over the data part of the packet and prepends it to the request:

PacketDigest=HMAC-SHA256IntegrityKey(Data).

The receiver verifies the request and rejects it if it fails. By verifying the integrity of the message, the receiver assures that the message was indeed transmitted by the other party, the same one that participated the handshake.

Siemens S7 protocol has various deficiencies, which make it suboptimal for large organizations. While examples based on Siemens products are provided, similar deficiencies exist for other vendors' ICS systems.

Non-unique identities: The PLCs may be identified only by their model and firmware version, they do not have a unique identity. I.e., an engineering station cannot distinguish between two PLCs with the same firmware version and model. For this reason, granular privileges cannot be assigned to the users and clients.

One-way authentication: The S7 protocol lacks of proper client authentication. Any engineering station may communicate with any PLC. It allows impersonation as used by the exemplary attack of Biham et al 2019.

Model-wide key: All the PLCs of the same model and firmware version hold the same private key. The TIA has the public keys of all the types of PLCs. It endangers the security of the protocol, as if one device is compromised, all PLCs of the same type may be also compromised as in the exemplary attack of Biham et al 2019.

Impersonation: Seemingly, the session ID and the sequence number together with the integrity protection prevent a replay attack. Yet, due to the lack of mutual authentication, a modified replay attack is possible and leads to client impersonation as shown in the exemplary attack of Biham et al 2019.

Scalability and fitness to large organizations: To protect from client impersonation, S7 supports PLC password protection. However, as previously explained this mechanism is not scalable and does not fit to large ICS deployments.

An illustration of the structure of the K7 packets, including handshake and payload packets, also showing the structure of a payload packet of S7, is provided.

An S7 message may be long, e.g., over megabyte, so the protocol supports fragmentation. When the TIA wants to send a long message, for example when downloading a new program, the protocol splits the message into several fragments, which may be encapsulated as packets.

Every S7 packet starts with a header and ends with a trailer. Both include the protocol ID (equals to 0x72) and the protocol version (the latest is version 3). The header also includes the length of the data part. Every packet after the handshake, i.e., as payload packet, contains an integrity protection part. It consists of the packet digest and its size.

The S7 payload packet is diverse and depends on the request. The data part of the S7 message starts with the definition of the message. The opcode field specifies the type of the message (e.g., the request opcode is 0x31 and the response opcode is 0x32). The function field specifies the operation that the TIA requests or the operation that the PLC responds to. For example, a program download is transmitted as a request message of CreateObject function (0x04ca).

Reference is now made to FIG. 16 which is an exemplary structure of a payload packet, according to some prior art. The leftmost bit in each row (bit 0) is the most significant bit, as in Jon Postel. Internet protocol. 1981.

Reference is now made to FIG. 17 which is an exemplary structure of a first message, according to some embodiments of the present invention.

The K7 protocol starts with a handshake. FIG. 17 specifies the structure of the first message. The K7 protocol is based on S7, so a K7 packet has all the high-level headers of the protocol and the structure of the message is similar to the structure of an S7 message. As described, the header may be extended to include both the session ID and sequence number. K7 protocol version is chosen arbitrarily as 250, since when a vendor such as Siemens adopts the protocol 4 or 5 may be preferred. On the other hand, 254 is used for keep-alive messages.

Reference is now made to FIG. 18 which is an exemplary structure of a second message, according to some embodiments of the present invention.

The second message may be of a similar structure, however the ticket may not be required and the opcode may change accordingly.

Reference is now made to FIG. 19 which is an exemplary structure of a K7 payload packet, according to some embodiments of the present invention.

Some implementations may drop the unnecessary digest length in the integrity protection part since the parties received SSAs with the MAC algorithm. The digest length derives from that.

It is expected that during the life of a patent maturing from this application many relevant protocols and topologies will be developed and the scope of the terms protocol, topology and the like is intended to include all such new technologies a priori.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, scripting languages such as Python, Perl or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, an integrated circuit or an electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments. The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A device for implementing supervision instructions while enforcing security policies in Industrial Control Systems, comprising of ICS clients and programmable logic control devices, adapted to industrial environment, the device supports the security policies using tickets distributed from a central authentication and authorization service, the device comprising:
   a memory storing instructions; and
   a processor operable to:
   receiving a request from an ICS client, the request comprising at least one request instruction and a ticket retrieved from the central authentication and authorization service, the ticket comprising:
      at least one of a cryptographic key, an ICS protocol indication, a version indication, identities of participating parties and a generation time in plaintext; and
      an encrypted part which comprises at least one of a cryptographic suite, a matching session key, a ticket expiration time and a permissions of the ICS client to perform various operations of a PLC; and
   verifying that the ticket is valid and permits the ICS client to instruct at least one programmable logic control to execute the at least one request instruction.

2. The device of claim 1, wherein the at least one programmable logic control is on a-at least one programmable logic control device, the at least one programmable logic control device having a legacy protocol compatible therewith, and when the ticket is valid and permits the ICS client to instruct executing the at least one request instruction on the at least one programmable logic control device:
   converting the at least one request instruction to the legacy protocol compatible with the at least one programmable logic control device; and
   transmitting the at least one request instruction to the at least one programmable logic control device.

3. The device of claim 1, wherein the at least one programmable logic control device is an integrated programmable logic control functionality, and when the ticket is valid and permits the ICS client to instruct executing the at least one request instruction on at least one of the programmable logic control, executing the at least one request instruction using the programmable logic control device functionality.

4. The device of claim 1, wherein the ICS client has a legacy protocol compatible therewith, and further comprising:
   receiving the at least one request instruction from the at least one ICS client; and converting the at least one request instruction from the legacy protocol to a protocol compatible with the security policies.

5. The device of claim 1, further comprising ICS client functionality, and further comprising generating at least one request instruction using the ICS client functionality.

6. The device of claim 1, further comprising a long-term key associated with a the ICS client and known to the corresponding authentication and authorization service, and transferring session security attributes from the corresponding authentication and authorization service to the ICS client, encrypted under the long-term key.

7. A device for transmitting supervision instructions compatible with security policies in Industrial Control Systems, comprising of ICS clients and programmable logic control devices, adapted for industrial environment, the device supports the security policies using tickets distributed from a central authentication and authorization service, the device comprising:
   a memory storing instructions; and
   a processor operable to:
   retrieving a ticket from the central authentication and authorization service;
   transmitting an ICS client request to a device comprising programmable logic control, the request comprising at least one request instruction and the ticket retrieved from the central authentication and authorization service, the ticket comprising:
      at least one of an ICS protocol indication, its a version indication, identities of participating parties and a generation time in plaintext; and
      an encrypted part which comprises at least one of a cryptographic suite, a matching session key, a ticket expiration time and a permissions of the ICS client to perform various operations of a PLC.

8. The device of claim 7, further comprising:
   receiving a response from the device comprising programmable logic control; and
   verifying that the response from the device comprising programmable logic control using the ticket.

9. A computer implemented method for enforcing security policies from a policy repository on programmable logic control devices, adapted for industrial environment, suitable for systems comprising programmable logic control devices, and using tickets distributed from a central authentication and authorization service, the method comprising:
   receiving a ticket at an ICS client from the central authentication and authorization service, the ticket comprising:
      at least one of a cryptographic key, an ICS protocol indication, a version indication, identities of participating parties and a generation time in plaintext; and
      an encrypted part which comprises at least one of a cryptographic suite, a matching session key, a ticket expiration time and a permissions of the ICS client to perform various operations of a PLC;
   sending a control device a request from the ICS client, the request comprising at least one request instruction and the ticket; and
   verifying by the control device that the ticket is valid and that the policy repository permits the ICS client to instruct at least one programmable logic control device to execute the at least one request instruction.

10. The computer implemented method of claim 9, wherein a policy repository contains a database of ICS clients, devices and permissions allowed by the organizational policy, and each ICS client or device record consists of an identity, and a set of long-term symmetric keys shared between the user, the ICS client, or the programmable logic control devices and the central authentication and authorization service.

11. The computer implemented method of claim 10, further comprising a long-term key associated with the ICS client and known to the corresponding authentication and authorization service, and transferring session security attributes from the corresponding authentication and authorization service to the ICS client, encrypted under the long-term key.

12. The computer implemented method of claim 11, wherein the ticket further comprises a MAC for verification of the ticket integrity using the long term key.

13. The computer implemented method of claim 11, preceded by sending a ticket request from an ICS client to an authentication and authorization service.

14. The computer implemented method of claim 10, wherein at least one long-term key is centrally set when the device is installed.

15. The computer implemented method of claim 9, further comprising when the ticket is valid and that the policy repository permits the ICS client to instruct executing the at least one request instruction on at least one of the programmable logic control devices in accordance with the ticket:
   converting the at least one request instruction to a legacy protocol compatible with the at least one of the programmable logic control devices; and
   transmitting the at least one request instruction to the at least one programmable logic control devices.

16. The computer implemented method of claim 9, further comprising when the ticket is valid and permits the ICS client to instruct executing the at least one request instruction on at least one of the programmable logic control, executing the at least one request instruction using the at least one programmable logic control device functionality.

17. A system, comprising ICS clients (engineering workstations and HMI servers and clients) and programmable logic control devices, adapted for industrial environment, and configured to implement the computer implemented method of claim 9.

18. The system of claim 17, wherein the ICS client further checks the response by validating the received authenticator.

19. The computer implemented method of claim 11, further comprising at least one policy information point, wherein the session security attributes are distributed via tickets.

20. The system of claim 17, comprising:
   at least one device for implementing supervision instructions while enforcing security policies in Industrial Control Systems comprising a legacy device, the legacy device is at least one of an ICS client and a programmable logic control device; and
   at least one device for implementing supervision instructions while enforcing security policies in Industrial Control Systems, comprising a functionality of at least one of an ICS client and a programmable logic control device.

21. A computer readable storage medium having instructions stored thereon, which, when executed by a computer, cause the computer to carry out the computer-implemented the method of claim 9.

22. An integrated circuit, designed to carry out the computer-implemented method of claim 9.

* * * * *